United States Patent
Zimmerman et al.

(10) Patent No.: US 11,531,945 B2
(45) Date of Patent: Dec. 20, 2022

(54) POINT-IN-TIME REQUIREMENT TRACKING METHODS AND APPARATUS

(71) Applicant: CenterPoint Properties Trust, Oak Brook, IL (US)

(72) Inventors: Scott C. Zimmerman, Park Ridge, IL (US); Cary Andrew Caveney, Elmhurst, IL (US)

(73) Assignee: CenterPoint Properties Trust, Oak Brook, IL (US)

( * ) Notice: Subject to any disclaimer, the term of this patent is extended or adjusted under 35 U.S.C. 154(b) by 0 days.

(21) Appl. No.: 16/915,188

(22) Filed: Jun. 29, 2020

(65) Prior Publication Data

US 2020/0327469 A1 Oct. 15, 2020

Related U.S. Application Data

(63) Continuation of application No. 15/443,587, filed on Feb. 27, 2017, now Pat. No. 10,699,228, which is a
(Continued)

(51) Int. Cl.
*G06Q 10/06* (2012.01)
*G06Q 10/10* (2012.01)
(Continued)

(52) U.S. Cl.
CPC ... *G06Q 10/06313* (2013.01); *G06F 21/6227* (2013.01); *G06Q 10/06* (2013.01);
(Continued)

(58) Field of Classification Search
None
See application file for complete search history.

(56) References Cited

U.S. PATENT DOCUMENTS 6,766,334 B1 * 7/2004 Kaier .................. G06F 8/71
707/999.203
8,191,044 B1 * 5/2012 Berlik ................. G06F 11/3672
717/124
(Continued)

FOREIGN PATENT DOCUMENTS

JP 2016021217 A * 2/2016

OTHER PUBLICATIONS

Demian et al. "An empirical study of the complexity of requirements management in construction projects" (2014) (https://www.researchgate.net/publication/265969278_An_empirical_study_of_the_complexity_of_requirements_management_in_construction_projects) (Year: 2014).*

*Primary Examiner* — Sujay Koneru
(74) *Attorney, Agent, or Firm* — K&L Gates LLP

(57) ABSTRACT

A system, methods, and apparatus for point-in-time requirement tracking are disclosed. In an example embodiment, requirements for a project are stored in a database communicatively coupled to a server, the requirements including at least a first requirement stored in a first record and a second requirement stored in a second record. The server receives changes to the first requirement and the second requirement during the edit session and stores the changed first requirement to a third record and the changed second requirements to a fourth record. The server then provides the first and third records to a client device so that the client device can concurrently display the first requirement as specified in the first record and the first requirement as specified in the third record.

19 Claims, 19 Drawing Sheets

Related U.S. Application Data continuation of application No. 13/529,802, filed on Jun. 21, 2012, now Pat. No. 9,582,777.

(51) Int. Cl.
  *G06Q 50/08* (2012.01)
  *H04L 67/01* (2022.01)
  *G06F 21/62* (2013.01)

(52) U.S. Cl.
  CPC ....... *G06Q 10/0631* (2013.01); *G06Q 10/103* (2013.01); *G06Q 50/08* (2013.01); *H04L 67/01* (2022.05)

(56) References Cited

U.S. PATENT DOCUMENTS

| | | | | |
|---|---|---|---|---|
| 8,224,472 | B1* | 7/2012 | Maluf | G06Q 10/06312 705/7.17 |
| 2002/0075293 | A1* | 6/2002 | Charisius | G06Q 10/06312 715/704 |
| 2004/0216045 | A1* | 10/2004 | Martin | H04L 12/1813 715/255 |
| 2005/0033628 | A1* | 2/2005 | Alverson | G06Q 10/0635 705/7.41 |
| 2005/0114829 | A1* | 5/2005 | Robin | G06Q 10/06 717/101 |
| 2005/0240379 | A1* | 10/2005 | Little | G06F 30/13 703/1 |
| 2006/0069986 | A1* | 3/2006 | Sandoval | G06Q 10/06 715/251 |
| 2007/0162316 | A1* | 7/2007 | Kratschmer | G06Q 10/06312 705/7.22 |
| 2007/0192155 | A1* | 8/2007 | Gauger | G06Q 10/0633 705/7.23 |
| 2007/0192478 | A1* | 8/2007 | Louie | G06Q 10/06 709/224 |
| 2007/0245300 | A1* | 10/2007 | Chan | G06Q 10/06 717/104 |
| 2008/0071562 | A1* | 3/2008 | Clemenson | G06Q 10/0631 705/7.12 |
| 2008/0126945 | A1* | 5/2008 | Munkvold | G06Q 10/06 715/733 |
| 2008/0301142 | A1* | 12/2008 | Marolf | G06Q 10/06 707/999.009 |
| 2009/0144097 | A1* | 6/2009 | Fassio | G06Q 50/163 705/314 |
| 2009/0174768 | A1* | 7/2009 | Blackburn | G06F 16/50 348/130 |
| 2010/0077316 | A1* | 3/2010 | Omansky | G06Q 10/10 345/173 |
| 2010/0106654 | A1* | 4/2010 | Simpson | G06F 30/13 709/206 |
| 2010/0174656 | A1* | 7/2010 | Nolan | G06Q 10/103 709/204 |
| 2010/0185547 | A1* | 7/2010 | Scholar | G06Q 10/06 707/754 |
| 2010/0293519 | A1* | 11/2010 | Groves | G06F 11/3616 717/101 |
| 2010/0302375 | A1* | 12/2010 | Terayoko | G06Q 10/06 348/333.02 |
| 2011/0109502 | A1* | 5/2011 | Sullivan | G06F 1/1626 715/810 |
| 2011/0119195 | A1* | 5/2011 | McLees | G06Q 10/103 705/301 |
| 2011/0213631 | A1* | 9/2011 | Mislavsky | G06Q 10/06 705/7.11 |
| 2012/0079408 | A1* | 3/2012 | Rohwer | G06Q 10/06 715/772 |
| 2013/0030860 | A1* | 1/2013 | Chaubey | G06Q 10/0633 705/7.27 |
| 2013/0155058 | A1* | 6/2013 | Golparvar-Fard | G06Q 10/06311 345/419 |
| 2013/0212583 | A1* | 8/2013 | Gordon | G06Q 10/00 718/100 |
| 2013/0226816 | A1* | 8/2013 | Chory | G06Q 10/06 705/301 |
| 2014/0033068 | A1* | 1/2014 | Gupta | G06Q 10/103 715/751 |
| 2014/0095122 | A1* | 4/2014 | Appleman | G06T 19/003 703/1 |

* cited by examiner

400

| EDIT SESSION 2 - RECORD | | | | | |
|---|---|---|---|---|---|
| AREA NAME | REQ. ID | REQ. DESCRIPTION | VERIFIED | SIGN. CH. | ATTACH. |
| ROOM XYZ | REQ 12 | 6 DEDICATED 20C CIRCUITS | NO | 18 | 📄 |
| ROOM XYZ | REQ 18 | 12 FOOT CEILING HEIGHT | NO | 25 | ▨ |
| ROOM ABC | REQ 20 | DATA CONNECTIONS ON 'N' AND 'S' WALLS | NO | 8 | |
| ROOM ABC | REQ 54 | BRUSHED CONCRETE PAD | NO | 12 | ▨ |
| HALLWAY 23 | REQ 1002 | 70' LENGTH, 5.6' WIDTH | YES | 85 | 📄 |
| BASEMENT 2 | REQ 2833 | 4 CEILING LIGHTS | NO | 2 | |

| REQUIREMENT HISTORY | | | | | |
|---|---|---|---|---|---|
| | EDIT SESSION | | | | |
| REQUIREMENT | 4/10/2009 | 9/10/2010 | 2/1/2011 | 6/1/2011 | 12/15/2011 |
| AIR FLOW RATE (CFM) | 0 ◇ | 5 ◇ | 5 | 15 ◇⚠ | 15 |
| CHILLED WATER MAX FLOW (GPM) | 10 ◇ | 10 | 12 ◇ | 12 | 12 |
| ELECTRICAL VOLTAGE PHASE | 120V/ 3-PHASE ◇ | 120V/ 3-PHASE | 120V/ 3-PHASE | 120V/ 3-PHASE | 240V/ 3-PHASE ◇ |
| $CO_2$ MAX FLOW (CFM) | 5 ◇ | 7 ◇ | 7 | 7 | 7 |

FIG. 5

POINT-IN-TIME REQUIREMENT TRACKING METHODS AND APPARATUS

PRIORITY CLAIM

The present application is a continuation of, claims priority to and the benefit of U.S. patent application Ser. No. 15/443,587, now U.S. Pat. No. 10,699,228, filed on Feb. 27, 2017, which is a continuation of U.S. patent application Ser. No. 13/529,802, now U.S. Pat. No. 9,582,777, filed on Jun. 21, 2012, the entirety of which is incorporated herein by reference.

BACKGROUND

In many commercial or industrial construction projects, a single project can have thousands of different requirements. Current project management tracking systems generally maintain a record of current project requirements. These known systems manage a database of project requirements that is accessible to authorized users associated with a project. These systems usually enable authorized users to make changes to requirements. The systems may then display an indication to other authorized users identifying which requirements have been modified or added. Generally, once a requirement has been changed and approved, past versions of the requirement are not available to be viewed.

In some instances, a history of requirements needs to be viewed. For example, project auditors need to review how project requirements have changed over time to determine why a project has become over budget. In other examples, project requirements may be improperly or incorrectly changed, thereby overwriting the correct requirements. In other instances, a final compliance check (final punch) has to be completed before a customer can approve the completion of a project. Oftentimes, the final compliance check includes approving changes to original requirements or determining why some requirements do not match the final result. In these instances, the customer or project manager has to review and verify hundreds or thousands or requirements.

In any of these instances, database architects generally have to recreate the requirements for previous time periods. Data analysts then have to painstakingly reconcile possibly thousands of requirements for the different time periods of a project to identify which requirements changed and exactly when each of the requirements changed. While there are some tools to help identify the differences between databases as a way to identify when requirements changed, these tools still require analysts to view each change. As a result, an audit or a recovery of previous requirements can take days or weeks to perform. A need exists to improve these inefficient and expensive project management tasks.

SUMMARY

The present disclosure provides a new and innovative system, methods, and apparatus for point-in-time project management requirement tracking. A project management server creates records for each requirement in a project and records for each change to each requirement. The project management server uses these individual records to display point-in-time histories for each of the requirements for auditing, compliance checks, project issue resolution, etc.

In an example embodiment, a project management server receives records of requirements for a project, each of the requirements being stored in a separate record. A client device communicatively coupled to the project management server opens an edit session to modify or change at least one of the requirements. The project management server stores changes to each of the requirements as a separate record. The project management server then causes the records to be displayed in association with each other such that the records corresponding to the changed requirements are displayed as a most recent version of the requirements. The project management server also enables the client device to display a history of changes to a particular requirement by concurrently displaying all records corresponding to the same requirement. The project management server further enables the client device to concurrently display all changes made to requirements during a particular edit session by determining which records have timestamps or references to a desired edit session.

Additional features and advantages of the disclosed system, methods, and apparatus are described in, and will be apparent from, the following Detailed Description and the Figures.

BRIEF DESCRIPTION OF THE FIGURES

FIGS. 4 and 5 are diagrams of example data structures showing requirement changes during edit sessions, according to an example embodiment of the present invention.

DETAILED DESCRIPTION

Figure 1:
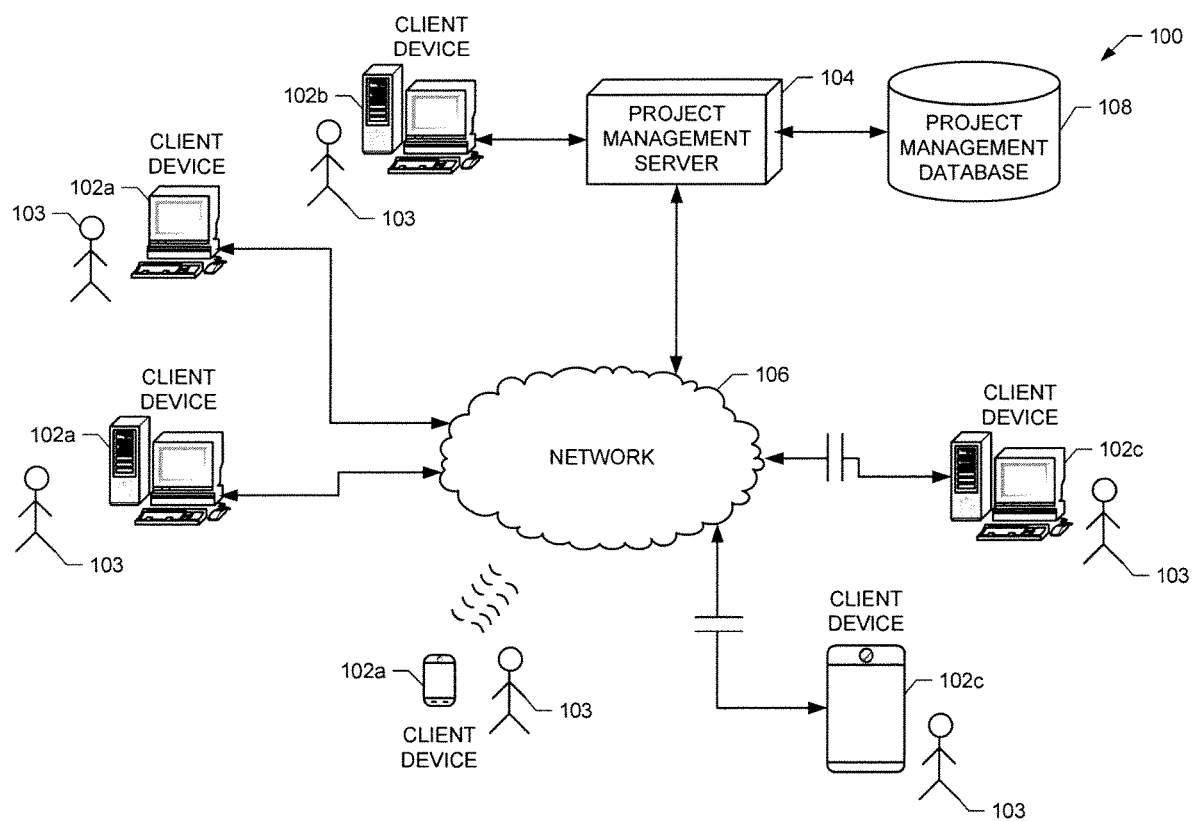
FIG. 1 is a block diagram of an example network communication system for point-in-time requirement tracking, according to an example embodiment of the present invention.

The present disclosure relates in general to a method, system, and apparatus to project management and in particular, to providing point-in-time requirement tracking for projects. Briefly, in an example embodiment, a system is provided which enables users to easily track requirements for projects using a point-in-time approach. This approach stores requirement changes made during edit sessions to records. The records can later be individually or collectively accessed to view a timeline as to how requirements have changed over the life of a project and determine at what points in time the changes were made to a project.

For example, a first record of a first requirement in a project is stored in a project management database. The first record includes an initial value or specification. The requirement may be part of a group of requirements that define all features and dimensions for individual aspects, areas, or rooms of a project. These requirements may include, for example, types and locations of electrical outlets in a room, ceiling height of a room, room dimensions, plumbing piping material, types of joints in a framework, species of wood for a floor, as well as any other physical attributes of the actual construction work, etc.

In this example, a project management server manages the requirements specified in records that are stored in the project management database. The server provides point-in-time requirement tracking by managing edit sessions in which requirements are changed by authorized users. After a user has finished making changes to, for example the first requirement, the project management server stores the change to a second record in the project management database. The server timestamps the second record with the time/date the change was made (or an identifier corresponding to a session in which the change occurred) and an identifier corresponding to the user who made the changes.

When an authorized user sends a request to view the first requirement, the project management server accesses the first and second records to determine a most recent version of the first requirement. The project management server then sends to the requesting user a copy of a record that is a most recent version of the first requirement (the first requirement as specified in the second record). In addition, the project management server can send a most recent version of the other requirements including unchanged requirements or requirements changed or added during an edit session.

In addition to providing copies of the most recent versions of requirements, the project management server provides point-in-time requirement tracking enabling a client device to concurrently display a history of a particular requirement. For instance, a user may request to view how a certain requirement for a room has changed over the life of a project. The project management server accesses all records that correspond to the requirement. The project management server then causes a client device to concurrently display the original requirement and all the subsequent changes to the requirement. This information also includes a time/date when the requirement was changed and which authorized user changed the requirement.

Further, the project management server provides point-in-time requirement tracking by enabling a client device to concurrently display all of the changes made for any edit session. For instance, a user may request to view all of the changes made during a particular edit session in the middle of a project. The project management server accesses records corresponding to the requested edit session to facilitate the display of all requirement changes made.

The point-in-time project management tracking features provided by the project management server enables project management personnel (or auditors/customers) to view how requirements over a life of a project have changed. For example, records of requirement changes can help personnel determine when a requirement began to deviate from a technical specification document. Additionally, records of requirement changes can help personnel determine which changes to a project caused the project to go over budget. The records of requirement changes also facilitate relatively quick and efficient project compliance checks or status updates. Further, records of requirement changes can help personnel determine whether changes to requirements were authorized or valid.

The example method, apparatus, and system disclosed herein determine which requirements that changed during an edit session have been verified by an authorized user. In some instances, requirements that have been changed during an edit session are not viewable to other users until the requirements have been verified or approved. In other instances, the changed requirements may be displayed to other users but may include an indicator highlighting that the requirements have not yet been verified. The method, apparatus, and system disclosed herein may record a time each requirement was verified and an identifier corresponding to an authorized user who verified the requirements. This enables auditors or other users to determine why and how certain requirements were changed and approved. Further, an alert may be displayed with the changed requirements or transmitted to appropriate users if requirements have not been verified within a predefined time period (e.g., days, weeks, project milestones, etc.).

In addition to tracking requirements, the example method, apparatus, and system disclosed herein also enable authorized users to attach or link documents, images, or any other project management data structures to requirements. For instance, the example method, apparatus, and system disclosed herein enable a user to attach progression images to a requirement. These images visually show the status of one or more requirements within the scope of the project at the time the image was captured.

Similarly, the example method, apparatus, and system disclosed herein enable users to attach documents to a requirement during an edit session. In some instances, the document may explain why the requirement was changed. In other instances, the document may include signatures of project management personnel who approved or analyzed the change to the requirement. The requirement tracking provided by example method, apparatus, and system disclosed herein enables users to determine during which edit session a document was associated with a requirement. Further, the example method, apparatus, and system disclosed herein enable the document to be viewed by a user selecting a link or icon displayed in conjunction with a record of the requirement.

In some example embodiments, each requirement may be linked or indexed to one or more technical specification documents. In these embodiments, the example method, apparatus, and system disclosed herein display a link or icon in conjunction with the corresponding requirement that a user can select to view a specific location in a technical specification document that discusses or defines the requirement. This enables project management personnel to quickly identity a source or definition of a requirement without having to scroll or page through a lengthy document. As requirements change, the example method, apparatus, and system disclosed herein determine which section(s) of the technical specification document corresponds to the requirement change and update the link or index of the changed requirement to the newly identified section of the document.

In other embodiments, the example method, apparatus, and system disclosed herein include cost tracking in association with requirement tracking. For example, the example method, apparatus, and system disclosed herein may prompt a user to specify a cost or significance value of a requirement change. The scope may be a numerical value that is proportionate to cost. Alternatively, the scope may be a descriptive term (such as 'signification scope,' medium scope, 'light scope,' etc.). In response to receiving an estimate or actual cost or scope, the example method, apparatus, and system disclosed herein determine a cost of all changes made during an edit session. This helps auditors or other project management personnel determine what changes significantly affected the cost of a project.

Throughout the following disclosure, reference is made to rooms of a project. These rooms are portions of a structure that are partitioned by walls. Typical construction projects define areas by rooms, which are relatively easily identifiable via blueprints or layout diagrams and enable project requirements to be precise and specific for relatively small areas of a structure. In other embodiments, the example method, apparatus, and system disclosed herein may use other types of structure classifiers such as, for example, areas, floors, columns, walls, etc.

Additionally, throughout the disclosure, reference is made to client devices, which can include any workstation, cellphone, smartphone, personal digital assistant ("PDA"), mobile device, tablet computer, computer, laptop, server, processor, console, gaming system, multimedia receiver, or any other computing device that has proper authentication or capability to access the disclosed system. The client devices are referenced as being used by users or authorized users.

The present system may be readily realized in a network communications system. A high level block diagram of an example network communication system 100 is illustrated in FIG. 1. The illustrated system 100 includes one or more client devices 102a to 102c being used by users 103, and one or more project management servers 104. The client devices 102a to 102c access, view, audit, or modify requirements managed by the project management server 104.

The users 103 can include any individual who uses point-in-time requirements tracking as provided by the example method, apparatus, and system disclosed herein. For example, these users 103 can include contractors, subcontractors, construction workers, home builders, project managers, project management personnel, auditors, customers, etc. Further, the users 103 can include any individual who is authorized to view, change, or verify changes to requirements.

The client devices 102a to 102c communicate with the project management server 104 via a connection to one or more communications channels 106 such as the Internet or some other data network, including, but not limited to, any suitable wide area network or local area network. It should be appreciated that any of the devices described herein may be directly connected to each other instead of over a network. The network 106 may also support wireless communication with wireless client devices 102a to 102c.

The project management server 104 manages point-in-time requirement tracking. To manage individual requirements, the project management server 104 is communicatively coupled to a project management database 108, which stores records of requirements and records of changes to requirements. The database 108 may be implemented by any conventional computer-readable medium, including RAM, ROM, flash memory, magnetic or optical disks, optical memory, or other storage media.

The example project management server 104 provides requirement tracking management by controlling how requirements are changed and manages records that store information specifying how the requirements have changed. The project management server 104 also provides access control and session management for users to access and view project management requirements stored in the database 108. The project management server 104 can also provide an interface (such as an application programmable interface ("API")) that configures or formats requirements for display on the client devices 102a to 102c. This enables any client device that is connected to the network 106 to be able to quickly and efficiently access, change, or audit requirements.

In an example, a new project is created by the project management server 104 creating a record for each received requirement in the project. Each record is stored in a data structure that is stored in the database 108. Additionally or alternatively, each record may be a row in a spreadsheet or an entry in a table that is stored in the database 108. In these instances, one or more sections of each record include information that identifies a requirement. Additionally, one or more sections of each record may identify a date/time a requirement was created and an identifier identifying an edit session during which a requirement changed. Further, each record may include sections that include descriptions or values for a requirement and one or more sections indicating whether a requirement is verified, in compliance, problematic, completed, etc. Moreover, each record may include one or more sections that enable files, images, or documents to be linked or indexed to the record.

Alternatively, each record may be a separate data structure or file that is individually stored in the database 108. In this alternative embodiment, each data structure may include an identifier of a requirement, an identifier of an edit session, a value or description of the requirement, and a date/time the data structure was created. Further, each data structure may include metadata or text that specifies whether the requirement was verified, in compliance, complete, etc.

The project management server 104 of FIG. 1 is capable of accessing the database 108 to search the individual records, thereby enabling the client devices 102a to 102c to search for individual requirements, sort requirements by room, or search for specific requirement descriptions or values. The example server 104 also manages changes to each of the requirements through edit sessions. An edit session is a software or programmable requirement management task where authorized users change or modify one or more project requirements. The project management server 104 provides a framework for users to modify any requirement of a project by hosting an edit session centrally or providing copies or records to a client device 102, thereby enabling the device to host an edit session locally.

Any time one of the client devices 102a to 102c changes a requirement, the project management server 104 creates a new record (e.g., a new row in a spreadsheet, a new data structure, or a new entry in a table) to store the change. The project management server 104 stores to the record an identifier of the requirement that was changed, an edit session identifier in which the change occurred, and the new value or description of the requirement. In instances where the edit session is local to a client device 102, the server 104 does not create records until the device synchronizes with the server 104.

The edit session identifier includes a date/time in which the change to the requirement occurred or a date/time in which the change to the requirement was verified by an authorized user. The edit session identifier can also include a numerical value of an order in which the edit session occurred (e.g., edit session number 5). The edit session identifier may further include an identifier of a user who changed the requirement and/or who verified the change. In some instances, the date/time in which a change to a requirement was verified can be changed, thereby causing the project management server 104 to re-sequence records for a requirement based on the most recent verification date. This enables project management personnel to manipulate an order or sequence of records in instances when a requirement has to be re-verified or an official date of a change has to be modified.

In some embodiments, the project management server 104 associates edit session identifiers of all requirements changed during an edit session with a global edit session identifier for the edit session. As a result, a user can change a verification date of an edit session globally, causing the project management server 104 to change the edit session identifier for each affected record. In this manner, the project management server 104 enables a user to modify or re-sequence records at the edit session level.

The project management server 104 stores records in the project management database 108 such that a most recent version of each requirement is provided to a client device upon request. To determine which record for a particular requirement is the most recent, the server 104 identifies which records are associated with a specified requirement and then uses the edit session identifier in each record to select the record having the most recent date or a greatest numerical value. Thus, for any project, the project management server 104 is able to display the most recent version of all the requirements in a project.

In addition to displaying the current status of requirements, the project management server 104 provides a change history for each requirement. For example, the client device 102a of FIG. 1 may request to view a history of a first requirement in a project. The project management server 104 searches the project management database 108 for records with an identifier corresponding to the first requirement. The project management server 104 then orders each record for display using corresponding edit session identifiers such that the most recent record is displayed first in descending order in a list. A user of the client device 102a may then concurrently view all of the changes to the first requirement as individual points-in-time during the life of the project.

The example project management server 104 also provides a history of each edit session. For example, the client device 102a may request to view all changes made during a particular edit session or all changes made before a specified date. The project management server 104 searches the project management database 108 for records with an edit session identifier that match the request. The project management server 104 then displays each of the records created during each edit session of interest. A user of the client device 102a may then concurrently view which requirements were changed and how each requirement was changed during each edit session.

The example project management server 104 may also link or index pictures, images, documents, or other data structures to appropriate records. Additionally, the project management server 104 may determine costs for changes made to requirements. Further, the project management server 104 may provide compliance verification such that a user may indicate which requirements are not implemented correctly at the project site. The server also provides requirement verification to indicate which requirement changes have been approved or verified. Moreover, the project management server 104 may index or link each record to a corresponding location in a technical specification document or architectural layout (blueprint). Descriptions for each of these features provided by the example project management server 104 are further described in conjunction with FIGS. 3 to 21.

In the illustrated example of FIG. 1, the client devices 102a and 102c are communicatively coupled to the server 104 via the network 106. In this embodiment, the client devices 102a are connected to the server 104 while the client devices 102c are occasionally offline. The example server 104 manages open connections with the devices 102a to create records as requirements are changed. In this instance, the server 104 may host a session and process data provided by the client devices 102a to change requirements.

In regard to the client devices 102c, the project management server 104 may transmit a copy of the records in the database 108. In this manner, the client devices 102c have a local version of the database 108. The records may be transmitted via a compiled data structure (e.g., a compilation), individually, or in a compressed file format. When the devices 102c are offline or disconnected from the server 104, the devices 102c operate a local application interface that enables a user to locally change requirements. The interface may be a local version or instance of the project management server 104.

In this example embodiment, records are created on the client devices 102c for each change. The client devices 102c may add an indicator (e.g., a replication status indicator) to each record indicating that the record has not been stored to the project management server 104. Then, when the client devices 102c reconnect with the project management server 104, the devices 102c determine which records have to be transmitted or pushed to the server 104 based on, for example, the replication status indicator. Thus, offline changes to the requirements are not realized system-wide until the devices 102c synchronize with the server 104.

The system 100 of FIG. 1 also includes the client device 102b that is locally connected to the project management server 104. This local connection can include any local area network (LAN), wireless LAN (WLAN), virtual private network (VPN), or virtual private LAN service (VPLS). In some embodiments, the client device 102b may include the project management server 104 (usually in embodiments where the functions performed by the server 104 can be localized on a desktop or laptop computer). Further, while FIG. 1 shows the single client device 102b, the server 104 may be directly connected to multiple client devices.

While the project management server 104 is shown as an individual entity, the server 104 may be partitioned or distributed within a network. For instance, the server 104 may be implemented within a cloud computing network with different processes and data instantiated at different servers or processors. Additionally, multiple servers or processors located at different geographic locations may be grouped together as the server 104. In this instance, network routers determine which client device 102a to 102c connects to which processor within the server 104. This distributed server 104 enables the functions and processing capability to be scaled based on traffic and demands by users and enables data propagation times to be reduced.

In a similar manner, the project management database 108 may be implemented as databases distributed over a cloud computing storage network. For example, different instances of the database 108 can store different projects. Alternatively, each of the databases 108 may store copies of the same records for each project. This enables the server 104 to access records when some network connections to some databases 108 are unavailable or overburdened.

Figure 2:
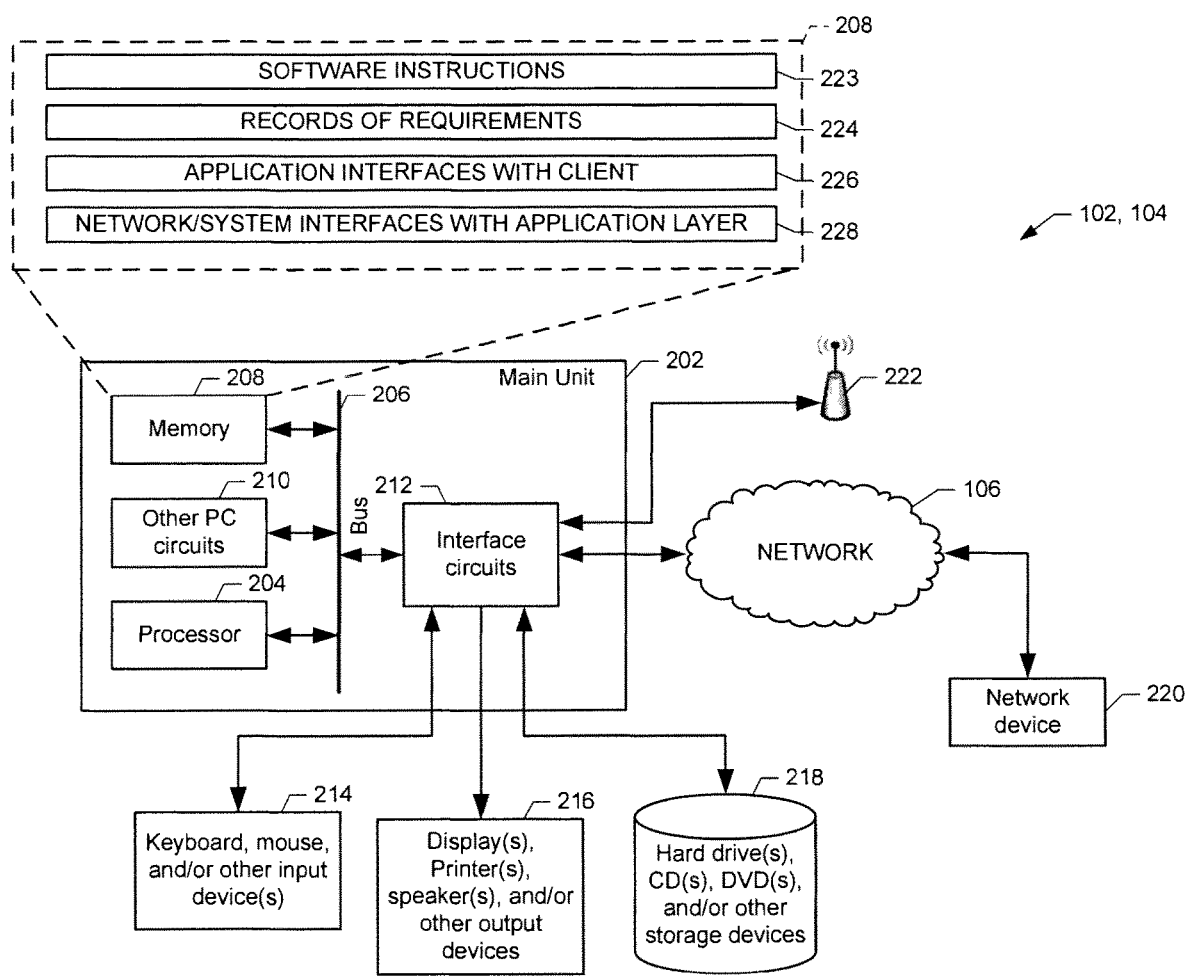
FIG. 2 is a detailed block diagram showing an example of a client device or a project management server, according to an example embodiment of the present invention.

A detailed block diagram of electrical systems of an example computing device (e.g., a client device 102, a project management server 104) is illustrated in FIG. 2. In this example, the computing device 102, 104 includes a main unit 202 which preferably includes one or more processors 204 communicatively coupled by an address/data bus 206 to one or more memory devices 208, other computer circuitry 210, and one or more interface circuits 212. The processor 204 may be any suitable processor, such as a microprocessor from the INTEL PENTIUM® or CORE™ family of microprocessors. The memory 208 preferably includes volatile memory and non-volatile memory. Preferably, the memory 208 stores a software program that interacts with the other devices in the system 100, as described below. This program may be executed by the processor 204 in any suitable manner. In an example embodiment, memory 208 may be part of a "cloud" such that cloud computing may be utilized by a computing devices 102, 104. The memory 208 may also store digital data indicative of requirements, documents, files, programs, web pages, etc. retrieved from a computing device 102, 104 and/or loaded via an input device 214.

The example memory devices 208 store software instructions 223, records of requirements 224, user interface features, permissions, protocols, configurations, and/or preference information 226. The memory devices 208 also may store network or system interface features, permissions, protocols, configuration, and/or preference information 228 for use by the computing devices 102 and 104. It will be appreciated that many other data structures and records may be stored in the memory device 208 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, image sensor, character recognition, barcode scanner, microphone, and/or a speech or voice recognition system.

One or more displays, printers, speakers, and/or other output devices 216 may also be connected to the main unit 202 via the interface circuit 212. The display may be a cathode ray tube (CRTs), a liquid crystal display (LCD), or any other type of display. The display generates visual displays generated during operation of the computing device 102, 104. For example, the display may provide a user interface and may display project requirements received from a computing device 102, 104. A user interface may include prompts for human input from a user of a client device 102 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as records, requirements, transaction data, operations data, historical access or usage data, statistical data, security data, etc., which may be used by the computing device 102, 104.

The computing device 102, 104 may also exchange data with other network devices 220 via a connection to the network 106 or a wireless transceiver 222 connected to the network 106. Network devices 220 may include one or more servers (e.g., the project management server 104), which may be used to store certain types of data, and particularly large volumes of data which may be stored in one or more data repository. A server may include any kind of data including databases, programs, files, libraries, records, images, documents, requirements, transaction data, operations data, configuration data, index or tagging data, historical access or usage data, statistical data, security data, etc. A server may store and operate various applications relating to receiving, transmitting, processing, and storing the large volumes of data. It should be appreciated that various configurations of one or more servers may be used to support and maintain the system 100. For example, servers may be operated by various different entities, including customers, project managers, service providers, application providers, construction managers, information services, etc. Also, certain data may be stored in a client device 102 which is also stored on a server, either temporarily or permanently, for example in memory 208 or storage device 218. The network connection may be any type of network connection, such as an Ethernet connection, digital subscriber line (DSL), telephone line, coaxial cable, wireless connection, etc.

Access to a computing device 102, 104 can be controlled by appropriate security software or security measures. An individual users' access can be defined by the computing device 102, 104 and limited to certain data and/or actions. Accordingly, users of the system 100 may be required to register with one or more computing devices 102, 104.

Record Data Structure Example Embodiments

Figure 3:
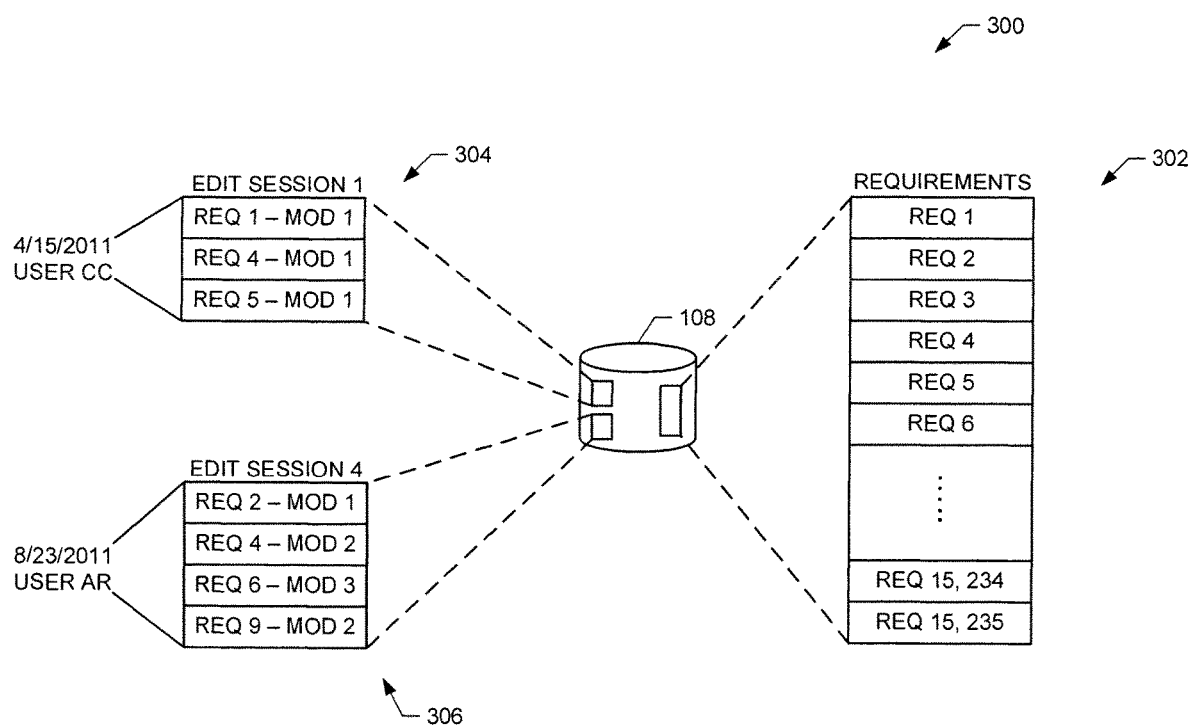
FIG. 3 is a functional block diagram showing management of records in a project management database, according to an example embodiment of the present invention.

FIGS. 3 to 5 show example embodiments of records managed by the project management server 104 of FIGS. 1 and 2. FIG. 3 shows a data structure 300 including records of requirements stored, for example, in the project management database 108. The database 108 includes a first group of records 302 that correspond to initial project requirements and second and third groups of records 304 and 306 that were created during edit sessions. The data structure 300 shows that each requirement or change to a requirement is stored by the project management server 104 as an individual record. This enables the project management server 104 to search and display requirements based on specified points-in-time.

The project management server 104 creates an individual record for each requirement by, for example, assigning, a project name (or identifier) to each requirement, a room or area location to each requirement (e.g., a room key), and a unique requirement identifier to each requirement. The project management server 104 also stores a time each record was created and/or verified (e.g., an edit session key or identifier). In some instances, the project management server 104 may also store to each record whether the requirement or requirement change has passed a compliance check or deviates from a requirement in a technical specification document.

In the illustrated example, the first group 302 is created by a client device 102 providing or transmitting a set of initial requirements to the project management server 104. The requirements may each be a line item in a spreadsheet, or alternatively, a separate data structure (e.g., a file). The project management server 104 also indicates in each record that the requirements were created during edit session '0' corresponding to the initial project creation. In this example, the first group of records 302 includes 15,235 records of individual requirements.

In addition to the first group of records 302, the example data structure 300 of FIG. 3 includes the second and third groups 304 and 306 of records. The second group of records 304 was created by the project management server 104 during a first edit session. During this first edit session, requirements 1, 4, and 5 were modified or changed. The third group of records 306 was created by the project management server 104 during a fourth edit session. The second and third edit sessions are not shown in this embodiment. During the fourth edit session, requirement 2 was changed for a first time, requirements 4 and 9 were changed for a second time, and requirement 6 was changed for a third time.

FIG. 3 shows that the project management server 104 creates a record for each requirement change. Each record in the second or third groups 304 and 306 includes an identifier of the requirement, which enables the project management server 104 to later access all changes to a requirement based on a requirement identifier. Each record also includes a description or value of the change to the requirement (e.g., MOD 1). Further, the project management server 104 stores to each record a date/time the change to the requirements occurred or a date/time the requirements were verified (e.g., Apr. 15, 2011 or Aug. 23, 2011) and an identifier of an individual (e.g., CC or AR) that changed or verified the records during an edit session. Additionally, the project management server 104 may assign a numerical value to each of the records in the second and third groups 304 and 306 that specifies the edit session in which each record was created (e.g., a '1' for the first edit session and a '4' to the fourth edit session).

FIG. 4 shows a diagram of an example data structure 400 of records created during a second edit session. In this example, the records are rows or lines in a spreadsheet or other type of data structure. Each record includes an area name (e.g., 'Area Name'), a requirement identifier (e.g., 'Req. ID'), a requirement description (e.g., 'Req. Description'), an indicator of whether the requirement was verified (e.g., 'verified'), a value of a significance of a change to the requirement (e.g., 'Sign. Ch.'), and an icon or link to an attachment (e.g., 'Attach'). In addition, each record can include an edit session identifier (not shown).

The data structure 400 is created by a client device 102 making changes or modifications to project requirements. The project management server 104 creates a record for each change. In an example, a client device 102 specifies that requirement 12 is to be changed by specifying that Room XYZ is to have 6 dedicated 20c circuits. In response, the project management server 104 creates a record with the requirement identifier of REQ. 12 and an area name of Room XYZ. The project management server 104 populates the new value of the requirement into the Req. Description section.

Additionally, the project management server 104 indicates that the change to requirement 12 is unverified. As a result, the change to requirement 12 may not be viewable to other users until the requirement is verified by an authorized user. In other instances, the project management server 104 may make the change viewable to other users but indicate the change has not been verified. In either instance, the project management server 104 may send an alert to appropriate users if the requirement has not been verified within a predetermined time period.

Further, the project management server 104 prompts a user of the client device 102 for a significance change value, which corresponds to a cost or value indicative of the requirement change. In other examples, the project management server 104 may determine this value by comparing the previous requirement value and the new requirement value and estimating a cost or significance value based on the comparison. The project management server 104 uses the values of the significance of the change to determine a total cost of all changes made during the edit session. This total cost may be displayed by the project management server 104 whenever a user requests to view all requirement changes made during, for example, the second edit session. Additionally, by applying a value to each record, the project management server 104 can determine how a cost of a requirement changed over a life of a project.

The example data structure 400 of FIG. 4 includes the attachment field to enable users to link documents to requirements through the corresponding record. In this example, the requirement 12 is linked to a document and the requirement 18 is linked to an image. The document may specify why requirement 12 was changed or include signatures of authorized individuals who approved the change.

The requirement 18 may be linked to an image by a user using a highlight tool to select a portion of an image corresponding to requirement 18. The project management server 104 stores pixel locations of the portion of the selected image to a section of a record including requirement 18. Alternatively, a user may store one or more images to an entity such as, for example a room or building. In these alternatively examples, any requirements associated with an entity are formatted or configured to be displayed by the project management server 104 in conjunction with images of the entity.

In other example embodiments, the document may link to a location of requirement 12 in a project technical specification or project blueprint. This enables a user to quickly view requirement 12 and a source of requirement 12 or where requirement 12 is located within a project area based on a designation in a blueprint. In some example embodiments, a user can link to or index a location within the document and instruct the project management server 104 to store the link or index to the record. In other example embodiments, the project management server 104 may perform a text scan (using a requirement identifier or requirement description) to locate the requirement in the document. The server 104 then links the location in the document to the record. In these other example embodiments, the project management server 104 automatically updates the link or index in the attachment section based on the change to the requirement. This feature prevents a user from having to re-link a requirement after changing a requirement.

Further, the project management server 104 may update the links or indexes for newer versions of the referenced document or blueprint. In these instances, the project management server 104 may also create new records if it determines that requirements have been changed in the technical specification document or blueprint. In this manner, the project management server 104 automatically changes requirements during an edit session that it initiated itself to reflect changes made in a project document.

The image linked to requirement 18 shows a progression image of a project that includes requirement 18. The progression images show areas of a project at different times in the project. Generally, progression images may show actual work on a project corresponding to one or more requirements. In some instances, a user has to specify which requirements are associated with which image at a particular time.

In some example embodiments, a user can attach a progression image to a requirement, causing the project management server 104 to link the image to each record of that requirement. In other example embodiments, the project management server 104 may identify records that were created close to a time the image was captured and link the image to those identified records. In yet other example embodiments, the user may specify which records are to be linked to the image. In further example embodiments, a user may instruct the project management server 104 to link a progression image to a newly created record in response to a requirement change.

FIG. 5 shows a diagram of an example data structure 500 showing points-in-time for four requirements. The points-in-time correspond to five edit sessions (Apr. 10, 2009, Sep. 10, 2010, Feb. 1, 2011, Jun. 1, 2011, and Dec. 15, 2011). The example project management server 104 of FIGS. 1 and 2 may cause the data structure to be displayed 500 in response to a client device 102 requesting to view a change history of the four listed requirements. In this example, a diamond icon indicates the edit sessions in which a requirement changed. A triangle icon indicates that a changed requirement has not been verified after a predetermined time period (e.g., an alert).

To create the data structure 500, the project management server 104 searches the project management database 108 for records corresponding to the identified requirements. The project management server 104 may filter these records for records corresponding to specified edit sessions. Alternatively, the project management server 104 provides the history of the specified requirements for all of the edit sessions in the project (in this case five edit sessions).

In the illustrated example, the Apr. 10, 2009 edit session corresponds to when the initial requirements were stored to the database 108. The project management server 104 shows a status of each of the requirements for each edit session in the example data structure 500, despite some requirements not being changed during an edit session. For instance, during the Sep. 10, 2010 edit session, only the Air Flow and CO2 Max Flow requirements were changed, as indicated by the diamond icon. As a result, the project management server 104 copies the values of the Chilled Water Max Flow and Electrical Voltage Phase requirements from the previous edit session. Thus, the project management server 104 is able to display via the data structure 500 a value for each of the requirements for specific points-in-time.

While not shown in FIG. 5, the data structure 500 can also include costs or significant changes in scope for each edit session or each requirement change. The project management server 104 may also link each value shown in the data structure 500 to the complete record including links to documents or progression images. Further, the project management server 104 may enable a user to view all of the changes made during an edit session by selecting the edit session in the data structure 500 or to view a history of a requirement by selecting the requirement in the data structure 500.

Embodiments of Example Applications

FIGS. 6 to 11 are functional block diagrams showing applications of point-in-time requirement tracking. These figures provide generalized diagrams of applications provided by the project management server 104 and the project management database 108 of FIGS. 1 and 2. For instance, each record is shown in FIGS. 6 to 11 as including a generalized record identifier. However, one of ordinary skill in the art will recognize that an actual implementation of the system described in conjunction with FIGS. 6 to 11 could include records with one or more requirement identifiers, room or area identifiers, descriptions or values of requirements, costs of changes to requirements, edit session identifiers, links to images or documents, information indicating whether requirements have been approved or verified, etc.

Example user interfaces of the functional block diagrams of FIGS. 6 to 11 are shown in conjunction with FIGS. 12 to 17.

Most Recent Requirements Example Embodiment

Figure 6:
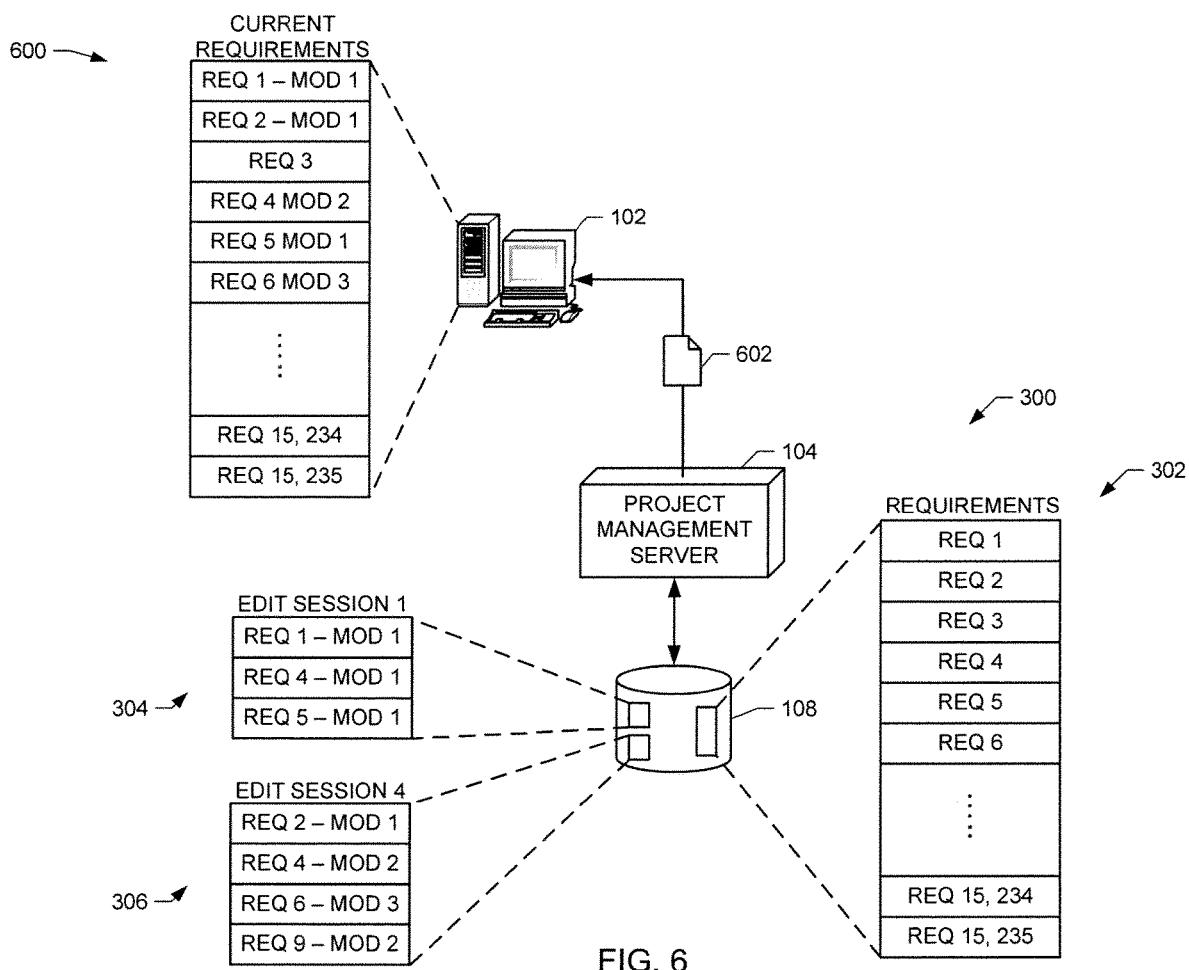
FIGS. 6 to 11 are functional block diagrams showing applications of point-in-time requirement tracking, according to an example embodiment of the present invention.

FIG. 6 shows a client device 102 displaying a most recent version of requirements 600 as determined by the project management server 104. In this example embodiment, the client device 102 requests the project management server 104 to provide a current version of the requirements for a particular project. In response to this request, the project management server 104 accesses the database 108 and performs a search for each requirement associated with the requested project. This includes accessing all records in data structure 300 including the first, second, and third groups 302 to 306 of records.

For each requirement, the project management server 104 identifies the most recent record, which is the record with the greatest numerical edit session value or the record with the most recent edit session identifier. In the example embodiment of FIG. 6, this includes the project management server 104 determining, for example, that the most recent version of the first requirement is associated with the record from the group 304 from the first edit session (e.g., Req. 1-Mod) and the most recent version of the third requirement is associated with the record from the original requirements in the first group 302. The project management server 104 compiles copies of records corresponding to the most recent version of the requirements and transmits this compilation 602 to the client device 102. The client device 102 receives and displays the records transmitted from the project management server 104. In this manner, the project management server 104 displays the records in association with each other such that the most recent version of each record is displayed for each requirement.

In some instances, the compilation of records 602 may be transmitted in a zip or other compressed file format. In these instances, the client device 102 unpacks the compressed file into the individual records. The client device 102 then displays each of the records, for example, as rows or line items in a data structure, table, or spreadsheet. In other instances, the client device 102 may receive the records as transmissions of data and information describing how the data is to be displayed (such as when the client device 102 displays records using a web browser or an application interface). In these other instances, the project management server 104 transmits the record and information describing how each record is to be displayed in a web browser or application interface.

Edit Session History Example Embodiment

Figure 7:
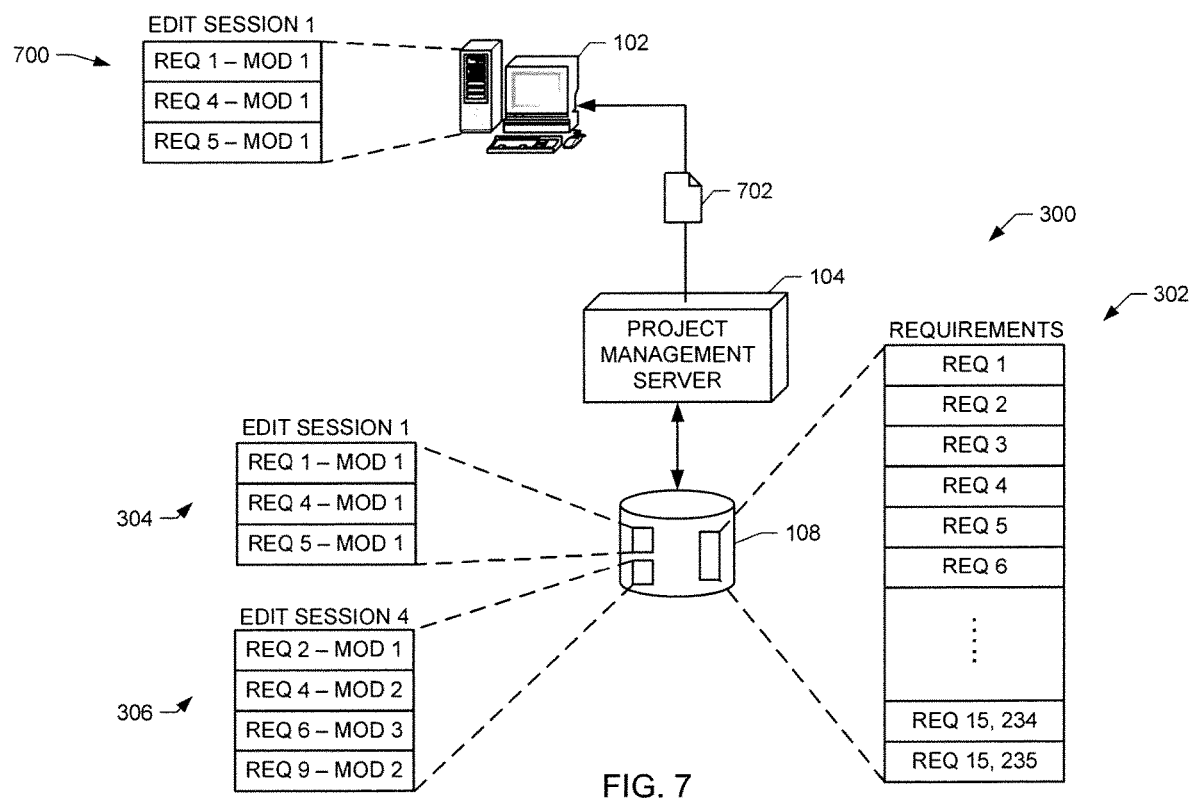

FIG. 7 shows a client device 102 displaying an edit session history 700 as determined by the project management server 104. In this example embodiment, the client device 102 requests to view what requirement changes were made during the first edit session. The client device 102 can request a specific edit session by a time/date (or range of times/days) or by a numeric identifier associated with an edit session (e.g., edit session '1'). In response, the project management server 104 searches the project management database 108 for records that have an edit session identifier or value that corresponds to the requested date/time or value.

In this illustrated example, the project management server 104 determines that records associated with the second group 304 match the request by the client device 102. The project management server 104 then compiles copies of the records and transmits this compilation 702 to the client device 102 for display to a user. In this manner, the example project management server 104 enables the client device 102 to concurrently display changes made to requirements 1, 4, and 5 as specified in the records of the second group 304, which were created during the first edit session. As a result, a user of the client device 102 is able quickly to view a point-in-time of requirements changed during a specific edit session.

Edit Session Cost Example Embodiment

Figure 8:
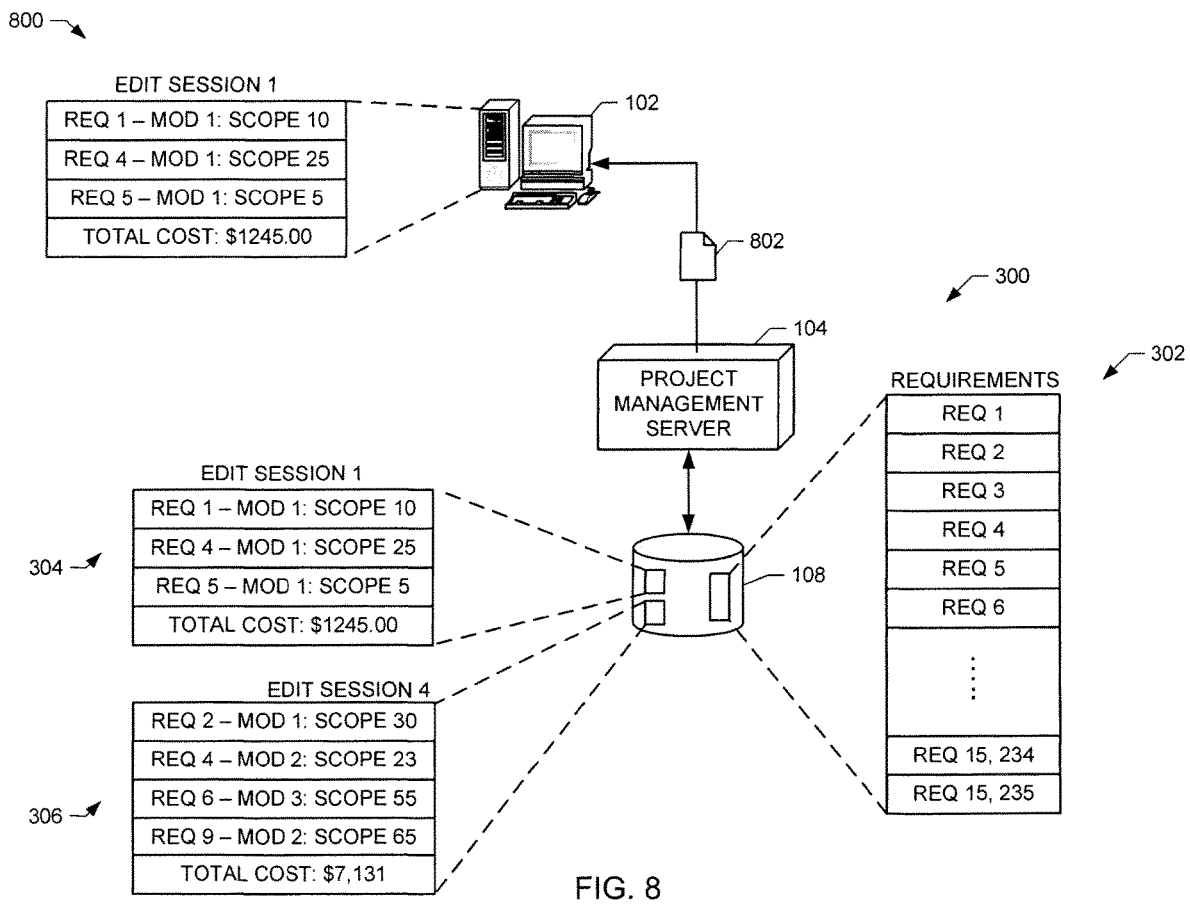

FIG. 8 shows a client device 102 displaying an edit session history 800 including a cost of the changes as determined by the project management server 104. The project management server 104 stores a cost for all changes made during an edit session. Additionally, the server 104 can store a cost for each change made during an edit session. In this example embodiment, the project management server 104 stores costs for each requirement change. For example, when requirements 1, 4, and 5 are changed during the first edit session, the project management server 104 prompts a user for a cost or project significance for each change. The project management server 104 then stores this value to the newly created record and determines a total cost for the edit session. Alternatively, the project management server 104 may determine each requirement change cost or significance value by comparing the change to the previous requirement value and accessing a database of estimated costs based on the change.

In the illustrated example, the client device 102 requests to view the changes made to requirements during the first edit session. In response, the project management server 104 identifies which records in the database 108 correspond to the first edit session: namely the requirements shown in the second group 304. As described in conjunction with FIG. 7, the project management server 104 transmits a compilation 802 of copies of the identified records to the client device 102. Here, the client device 102 displays each of the records for the first edit session including a value associated with the significance of the change described by the requirement. For instance, the change to requirement 1 (e.g., Mod 1) has a significance value of 10.

In addition to transmitting the compilation 802, the project management server 104 also transmits the total cost of the edit session. In some examples, the project management server 104 may access a record in the database 108 that includes the total cost, which was determined during the first edit session. In other examples, the project management server 104 may determine the cost after the client device 102 requests to view the first edit session. The project management server 104 may determine the total cost based on significance values by accessing a data structure that references significance values to a cost for different types of requirements.

In this manner, the project management server 104 tracks costs associated with each requirement change. This enables users to determine the cost of each requirement change to identify project budget issues or to determine whether a change in the project is feasible based on the cost. Further, because the project management server 104 enables a user to view a cost for each edit session, a user can quickly and efficiently determine which changes caused the most significant cost increases in a project without having to view each record individually.

Room Specific Requirements Example Embodiments

Figure 9:
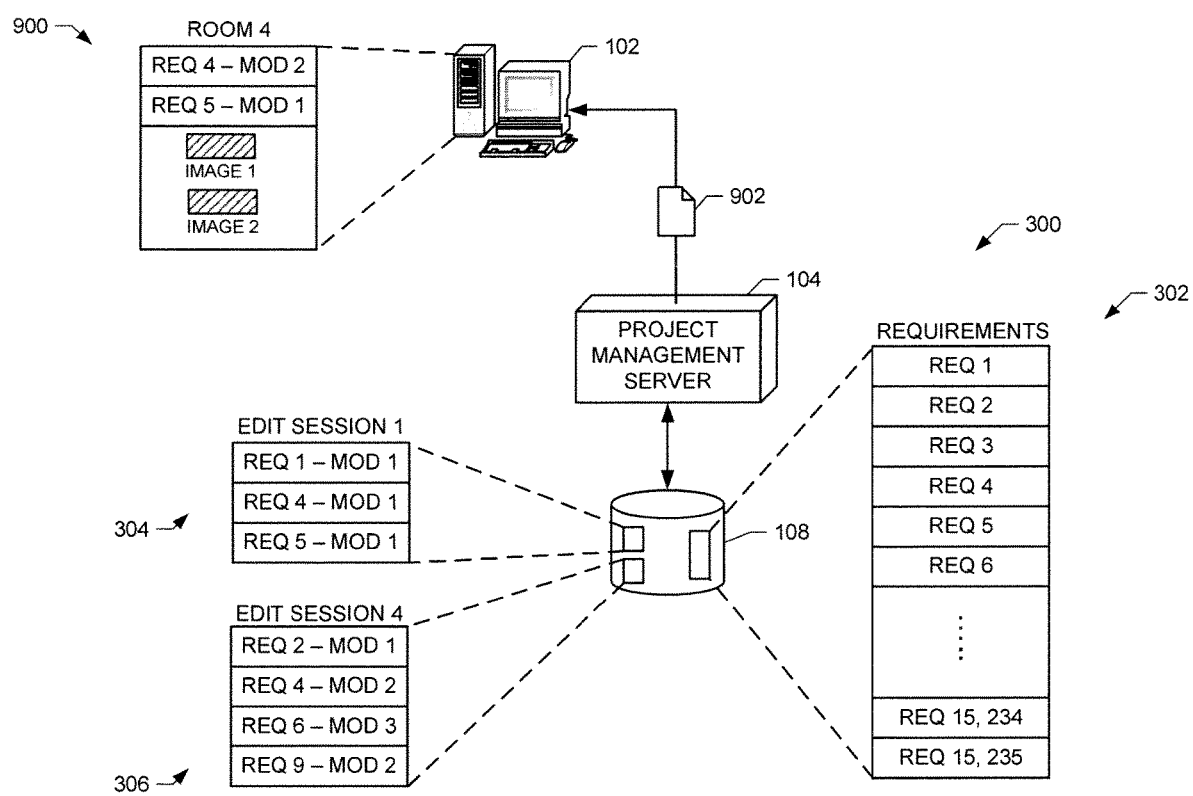

FIG. 9 shows a client device 102 displaying records 900 for a specified room as determined by the project management server 104. In this embodiment, the client device 102 requests to view all of the most current requirements associated with Room 4. In response, the project management server 104 searches the project management database 108 for records with a room or area identifier that corresponds to Room 4. The project management server 104 then identifies the most recent record for each requirement. After identifying the most recent records, the project management server 104 compiles copies of the records and transmits the compilation 902 to the client device 102.

In this example, the project management server 104 determines that requirement 5 includes links or references to progression images 1 and 2. As a result, the project management server 104 includes thumbnail versions of the images within the compilation 902 transmitted to the client device 102. The client device 102 is able to display these thumbnail images as part of the record for requirement 5. The project management server 104 may transmit a copy of the progression images 1 and 2 to the client device 102 upon a request from a user. Alternatively, the project management server 104 may transmit a copy of the images 1 and 2 within the compilation 902.

In another example, the client device 102 may receive copies of the records for requirements 4 and 5. In response, a user may instruct the server 104 to attach, link, or otherwise associate the images 1 and 2 with the record of requirement 5. The project management server 104 receives the instruction, stores the images 1 and 2 to the database 108 and associates the images with the record of requirement 5. In some examples, the user can indicate to associate both requirements 4 and 5 with the images. Additionally, the project management server 104 may indicate in the record a time/date when the image was captured based on metadata within the image. As a result, a user is able to add an image of a project site to one or more requirements without initiating a new edit session.

Figure 10:
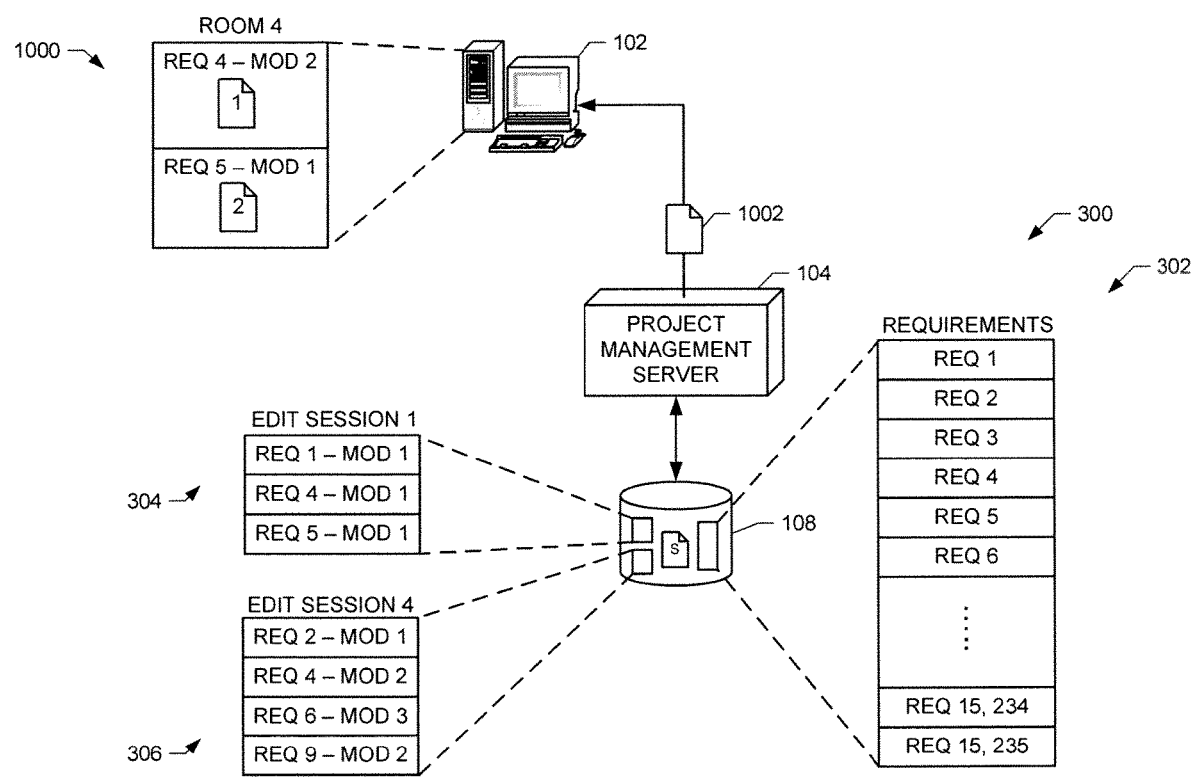

FIG. 10 shows the client device 102 displaying records 1000 for a specified room as determined by the project management server 104. In this embodiment, each record includes or is associated with a document. The project management server 104 may transmit the documents 1 and 2 within compilation 1002. Alternatively, the project management server 104 may transmit the documents upon a request by the client device 102. These documents enable a user to view, for example, requirement change information regarding the associated record.

In an alternative embodiment, a user may instruct the project management server 104 to link or otherwise associate requirement 4 with document 1 and requirement 5 with document 2. In response, the project management server 104 stores a copy of the documents 1 and 2 to the project management database 108 and places a link in each record to the appropriate document. The project management server 104 may also store to the appropriate record a time/date the document was created.

Document Indexing Example Embodiment

In an alternative embodiment, the documents 1 and 2 of FIG. 10 represent links to specific locations in a technical specification document S stored within the project management database 108. A user may select, for example, document 1, causing the client device 102 to send an index location or reference location (e.g., a chapter, page number, section, etc.) designated by document 1 to the project management server 104. In response, the project management server 104 locates the referenced or indexed location in the technical specification document S and returns a copy of that portion of the document S (or a uniform resource locator ("URL") of that portion of the document S) to the client device 102 for display to a user. Alternatively, the project management server 104 may transmit a copy of the entire technical specification document S to the client device 102 with an instruction to open to the document S to the location referenced by the document 1.

As described in conjunction with FIG. 4, the project management server 104 may determine whether a requirement is within the range of deviation of a project requirement by comparing the requirement as specified in a record to the information in a technical specification document that defines the requirement. In the example of FIG. 10, the project management server 104 may determine that requirement 4 deviated from a specified requirement in the technical specification document S. As a result, the project management server 104 transmits an alert to the client device 102, causing the client device 102 to display the alert in conjunction with the record for requirement 4. In this manner, the example project management server 104 ensures changes to requirements do not exceed a specified range and transmits alerts to appropriate users if a deviation is detected. In some instances, the project management server 104 may prevent a user from changing a requirement to a value that is outside of a specified range in a technical specification document.

Requirement History Example Embodiment

Figure 11:
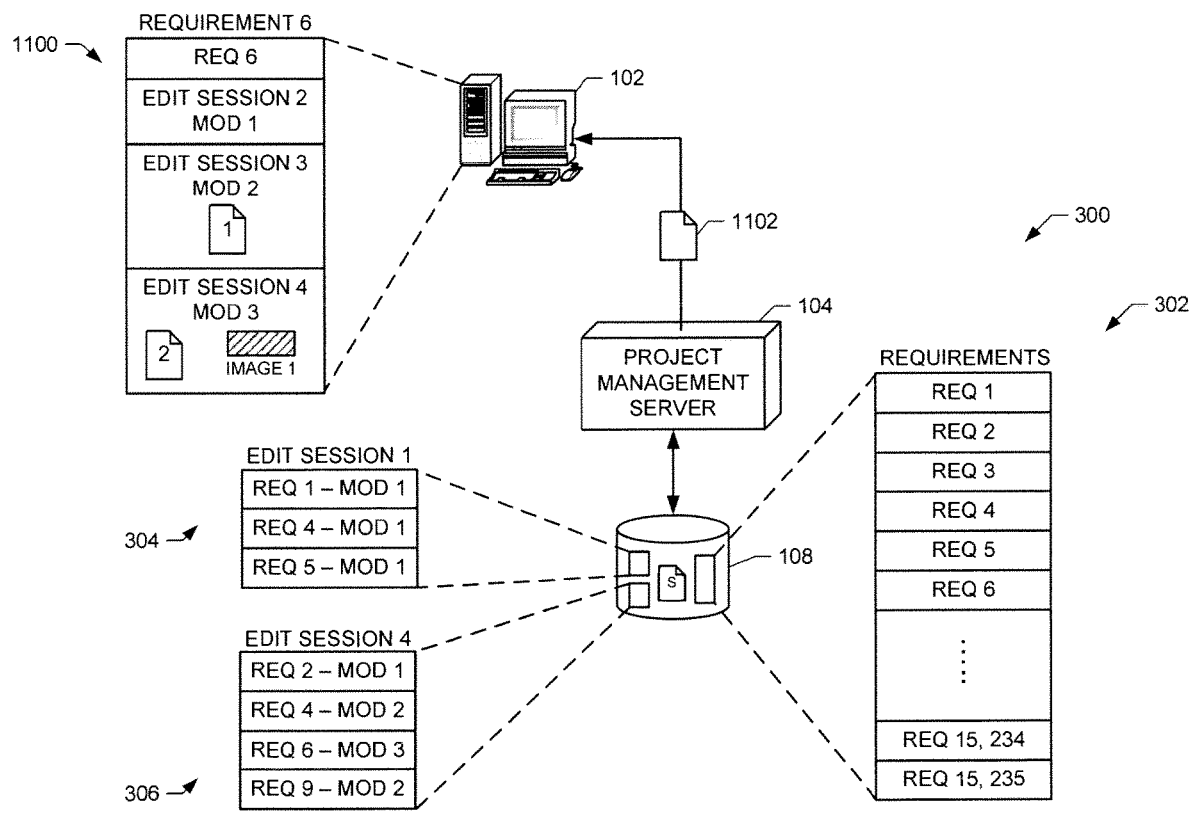

FIG. 11 shows a client device 102 displaying records 1100 for a specified requirement as determined by the project management server 104. In this embodiment, the client device 102 requests to view a history of requirement 6. In response, the project management server 104 searches the project management database 108 for records that include identifiers corresponding to requirement 6. The project management server 104 then compiles copies of these records into compilation 1102 and transmits the compilation 1102 to the client device 102. The client device 102 then displays the records 1100 for a user.

In this manner, the project management server 104 causes the client device 102 to concurrently display the first requirement as specified by the associated records. This enables users to quickly view a history of a requirement to determine how the requirement has changed over the life of a project. This may help auditors efficiently determine how or why elements of a project changed and how these changes affected the overall cost, timing, or structure of the project. Further, displaying a history of a requirement may help a customer through a compliance check to determine why a requirement fails to correspond to actual work performed on a project.

In the illustrated example, the records 1100 include the original requirement (i.e., Req. 6) and three subsequent changes to requirement 6. The records show edit session identifiers (e.g., edit session 2) for the subsequent changes to requirement 6, which the project management server 104 uses to order the individual records so that the most recent record is displayed at the bottom of the list. In other examples, the project management server 104 may display the most recent record at the top of a list.

The example records 1100 include documents 1 and 2 associated with respective records. As discussed above in conjunction with FIG. 10, these documents may describe changes made to requirement 6 or, alternatively, indicate links or indexes to corresponding locations in a technical specification document or blueprint. Further, the record associated with the third change (Mod 3) includes progression image 1. This image shows a visual status of requirement 6 at or about the time that the third change was made to requirement 6. In alternative embodiments, the documents 1 and 2 and progression image 1 could be shown as being associated with the requirement 6 instead of with each individual record.

User Interface Example Embodiments

FIGS. 12 to 16 are diagrams showing point-in-time requirement tracking user interfaces 1200 to 1600. These user interfaces 1200 to 1600 are displayed, for example, by a client device 102. The user interfaces 1200 to 1600 are rendered for display by the project management server 104.

FIGS. 12 to 16 are example embodiments of requirement information provided by the project management server 104. In other embodiments, the user interfaces 1200 to 1600 can include fewer features or additional features. For example, the user interfaces 1200 to 1600 could also display cost information for each requirement change. Further, while the user interfaces 1200 to 1600 show records as being displayed as rows in a data structure, in other embodiments the records could be displayed as separate data structures.

Requirement Search Example Embodiment

Figure 12:
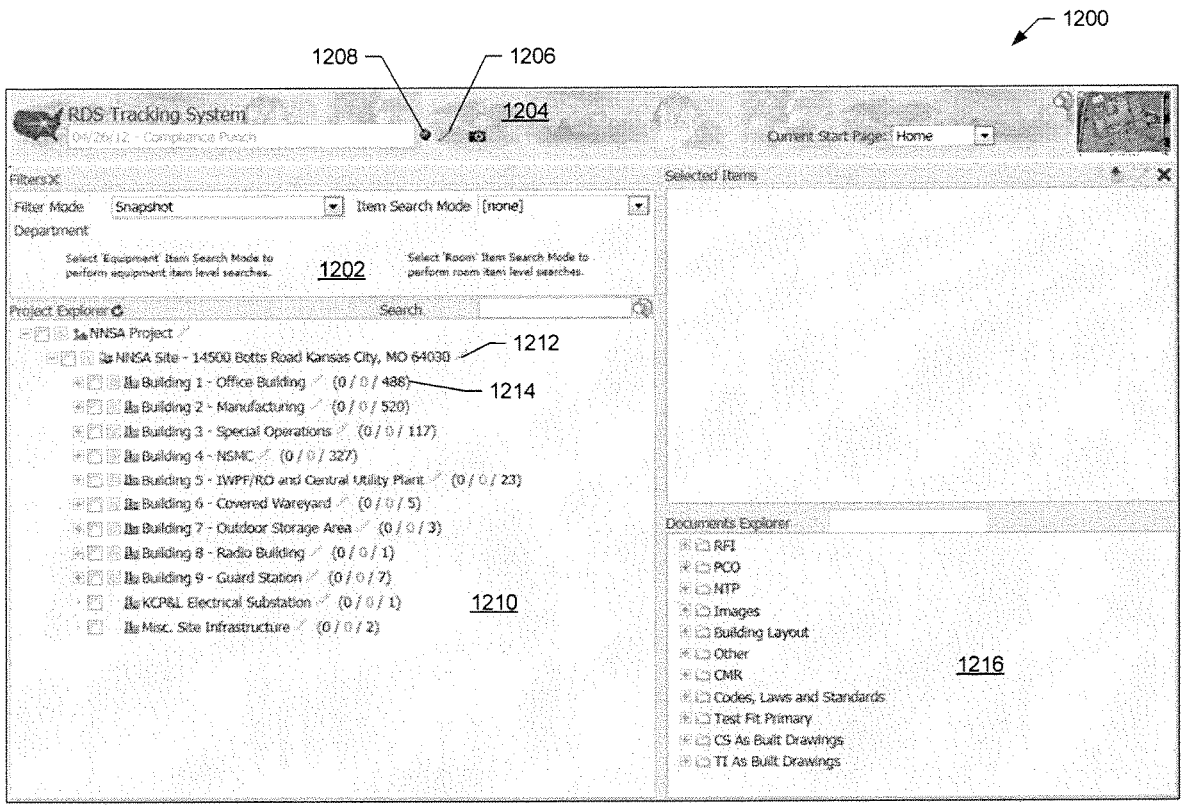
FIGS. 12 to 16 are diagrams showing point-in-time requirement tracking user interfaces, according to an example embodiment of the present invention.

FIG. 12 is a diagram showing the user interface 1200 displaying project explorer information. Section 1202 includes functionality that enables a user to search for requirements based on a value or a description (Item Search Mode or Search). The section 1202 also includes functionality that enables a user to search for requirements by providing a project name, a room name, an area name, an edit session identifier, or any other type of keyword.

Section 1204 includes functionality that enables a user to begin an edit session. For example, a user may use the interface 1200 to search for specific requirements then select icon 1206 to begin an edit session to change the desired requirements. For example, selecting the icon 1206 may instruct the project management server 104 to begin processing changes to requirements specified by the user in the interface 1200. Additionally, icon 1208 may change color or shape indicating that the user interface 1200 has begun an edit session.

Section 1210 includes functionality that provides a hierarchy of a selected project. In this example, the user interface 1200 shows that a NNSA project has been selected and shows buildings and structures associated with the project (e.g., Building 1). A user may select a building, causing the project management server 104 to provide rooms or areas within the selected building. A user may further select a room or area, causing the project management server 104 to provide the most recent requirements for the selected room or area.

Section 1210 also includes icons 1212 that enable a user to send an instruction to the project management server 104 to begin editing requirements associated with the selected icon. For instance, a user may select icon 1212 associated with Building 1, which causes the project management server 104 to provide copies of records for all the requirements for Building 1 in an edit session environment. A user may then edit desired requirements, causing the project management server 104 to create a record storing the changes to each requirement.

Section 1210 further includes stop lighting 1214 to indicate a status of each building. The stop lighting 1214 is determined by the project management server 104 accessing records associated with, for example Building 1, and compiling statuses for each record. For example, Building 1 has a (0/0/488) stop light 1214. The first value identifies a number of rooms or requirements in Building 1 that have begun (e.g., 0), the second number identifies a number of rooms or requirements in Building 1 that have been completed (e.g., 0), and the third number identifies a number of requirements that have not been verified or started compliance (e.g., 488). In other embodiments, the stop lighting 1214 can also include a number of requirement deviations, a number of edit sessions, a number of changed requirements, or a percentage of requirement changes that have been verified.

The user interface 1200 of FIG. 12 also includes section 1216, which includes functionality that enables a user to search for a document or image. For instance, a user may select one of the data structure types (e.g., Building Layout) to search documents classified as defining a building layout. Upon a user selecting a data structure type, the project management server 104 searches the project management database 108 for all documents that match the request. In addition to providing the document, the project management server 104 may also provide records that are linked to or otherwise associated with the selected document. Section 1216 may also provide functionality that enables a user to upload or transmit documents to the project management server 104 to store to the database 108 or enable users to edit documents.

Entity Requirements Example Embodiment

Figure 13:
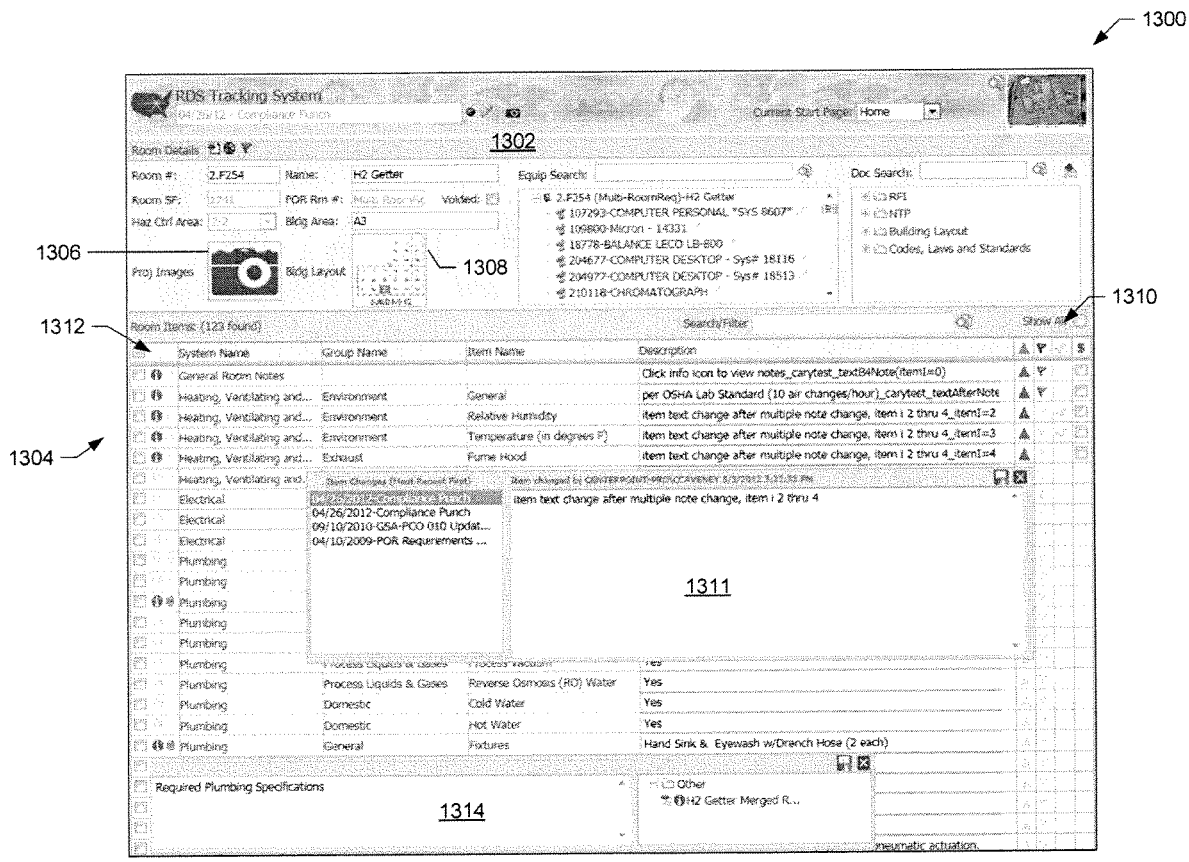

FIG. 13 is a diagram showing an example user interface 1300 displaying requirements for an entity (a room). The user interface 1300 includes section 1302, which includes functionality that enables users to search for requirements. In this example, a user has searched for requirements for Room #2.F254. In response, the project management server 104 has provided records with the most recent version of the requirements associated with Room #2.F254, as shown in section 1304.

In this example, section 1302 also includes an image section 1306 that displays any progression images associated with Room #2.F254. The section 1302 further includes a map section 1308 that shows where Room #2.F254 is located within the corresponding building. The images and building location are provided in the user interface 1300 by the project management server 104.

In the illustrated example, section 1304 includes 123 records provided by the project management server 104. The displayed records include information describing a room identifier (e.g., System Name), a project group identifier (e.g., Group Name), a requirement identifier (e.g., Item Name), and a description of the requirement (e.g., Description). In other examples, the section 1304 can also display an edit session identifier, which specifies when each requirement was last changed prior to the current edit session.

Section 1304 also includes status icons 1310. In this embodiment, the triangle icons indicate whether a requirement has been changed during the current edit session. A user may select a triangle icon, causing the project management server 104 to provide requirement history information displayed in user interface 1311. The user interface 1311 (e.g., a requirements status window) is similar to the records 1100 discussed in conjunction with FIG. 11. In this example, user interface 1311 shows records of a requirement changed during prior edit sessions (e.g., Apr. 26, 2012, Sep. 10, 2010, and Apr. 10, 2009). The user interface 1311 also includes a complete description of a requirement. This enables a user to view lengthy requirements that cannot be adequately displayed in section 1304. A user may select any of these records to concurrently view how a previous version of a requirement compares to a current version or newly changed version of a requirement displayed in section 1304 of user interface 1300.

The flag icons included within the status icons 1310 indicate that an issue exists with a requirement. For instance, a user may select a flag icon to indicate a feature of a room or a building does not comply with a specific requirement. The user may select the check mark to indicate the room or building feature conforms to the requirement. In other instances, a user may select the flag icon to indicate there is an issue with the requirement. Alternatively, the project management server 104 may select a checkbox icon when it detects that a requirement has been changed to deviate from requirements specified in a technical specification document.

The status icons 1310 also include the check marks to indicate whether a requirement has been verified. The project management server 104 may change a check mark into an alert if a changed requirement has not been verified within a predetermined time period. Further, upon a user selecting a check mark, the project management server 104 may provide a time/date in which the requirement was verified and an identity of a user who verified the requirement.

The status icons 1310 further include a cost icon. A user may select the cost icon to add cost or significance scope values to a changed requirement. In other examples, the project management server 104 may determine a cost after a user has changed a requirement.

The section 1304 of FIG. 13 also includes attachment icons 1312, which indicate whether a note, document, or image is indexed or linked to a record or a requirement. In this example, the information icon (the 'i' icon) indicates that a user has added notes to a change, which the project management server 104 stores to the appropriate record. The paperclip icon indicates that a file or progression image is indexed or linked to a record or requirement. In FIG. 13, user interface 1314 is displayed by the project management server 104 after a user has selected an information icon. This user interface 1314 in this example shows notes provided by a user describing a document linked to a requirement.

Figure 14:
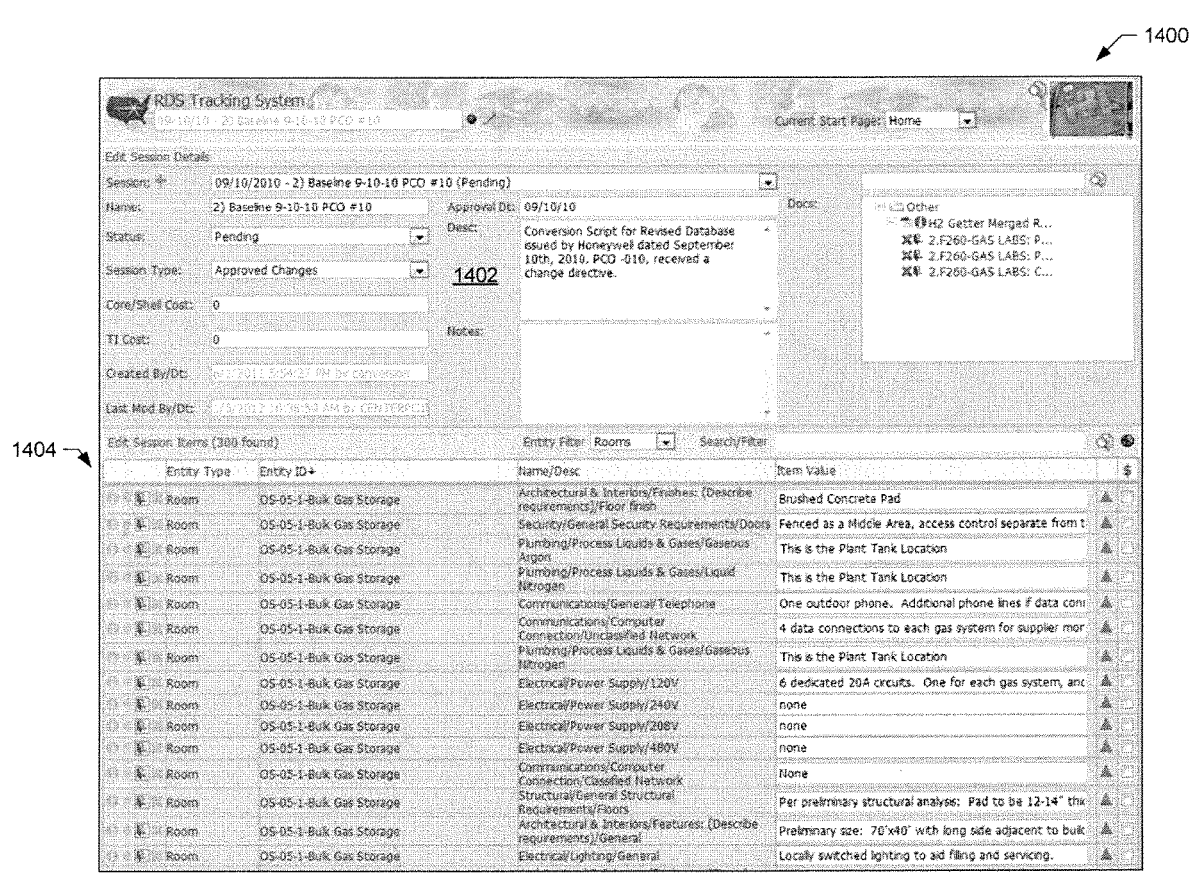

FIG. 14 is a diagram showing the user interface 1400 displaying an embodiment of an edit session. In this embodiment, section 1402 includes, among other things, an edit session identifier (e.g., Name), a status of the edit session (e.g., Status), a cost of changes made during the edit session (e.g., Core/Shell Cost), user identifier information (e.g., Created by/Dt), and a description of changes made during the edit session (e.g., Desc). The section 1402 also includes a documents section (e.g., Docs) that enables a user to transmit via the user interface 1400 documents to the project management server 104 for attachment to one or more records.

In this example, the status of the edit session determines whether or not the project management server 104 provides records of the changes to other users. This prevents records of requirements from being shown before an edit session has been completed. Thus, the project management server 104 may only make the records created during the edit session available when a user changes the status of the edit session to a finalized status.

Section 1404 in the user interface 1400 provides a listing of records of requirements that were changed during the edit session. The section 1404 includes a search/filter that enables a user to view requirements based on, for example, a room, an area, a requirement identifier, or a requirement value. The records shown in section 1404 may also be sorted by column. The project management server 104 performs the search and/or sorting of records based on information provided by the user through the user interface 1400.

In the embodiment of FIG. 14, the section 1404 includes for each record, a room or area type (e.g., Entity type), a requirement identifier (e.g., Entity ID), a description about the requirement (e.g., Name/Desc), and a value for the requirement (e.g., Item Value). The Section 1404 also includes status and attachment icons, as described in conjunction with FIG. 13. In the illustrated example, a user may change requirements by entering or modifying information in the Item Value field. Upon a user providing new information or modifying current information, the user interface 1400 (via the client device 102) sends the information and an identifier of the corresponding record to the project management server 104, which then creates a new record to reflect the changed requirement.

Multiple Requirement Modification Example Embodiment

Figure 15:
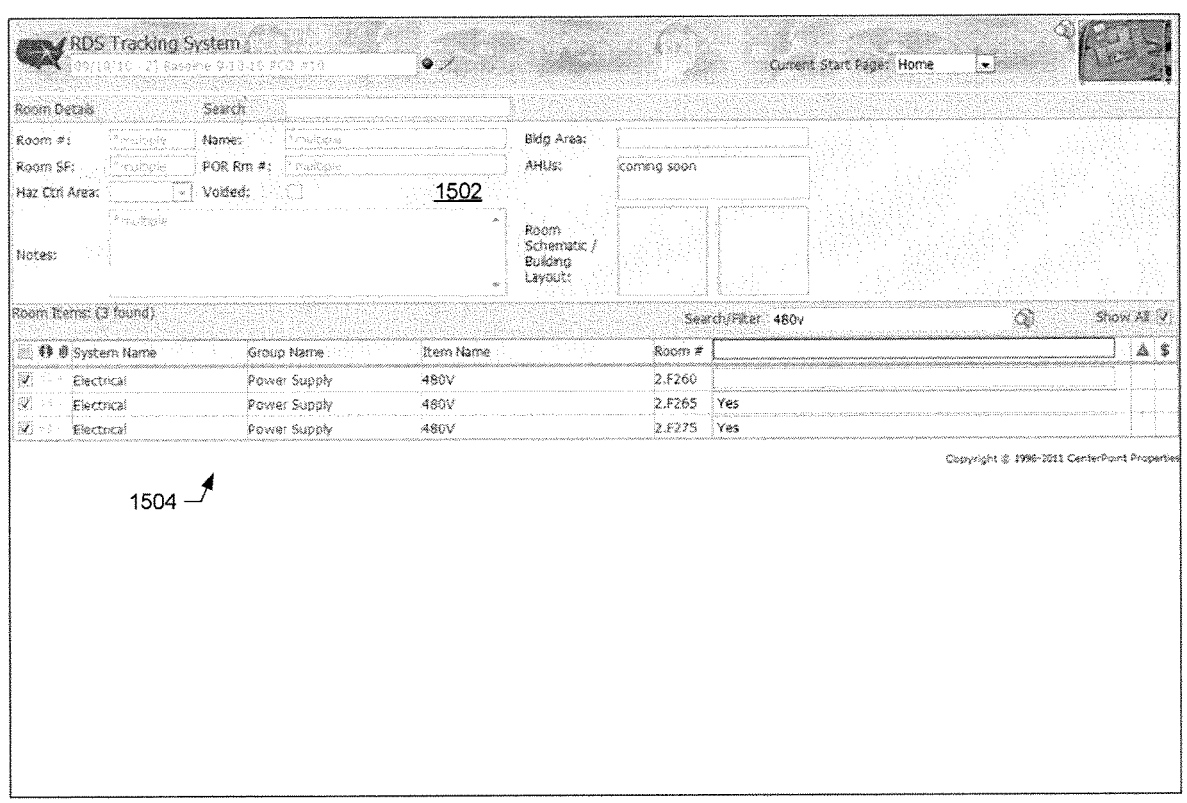

FIG. 15 is a diagram showing an example user interface 1500 displaying requirements common to one or more entities such as, rooms or buildings. In this embodiment, a user selects to edit requirements for multiple rooms or areas. Section 1502 shows that a user has selected multiple rooms by, for example, selecting rooms in section 1210 of user interface 1200. Additionally, a search/filter function in section 1504 shows that a user has requested that the project management server 104 further filter records based on which requirements include a requirement value of 480V. These features enable a user to change a similar value for requirements associated with different rooms or areas.

Section 1504 also shows that the user interface 1500 enables a user to select more than one record at a time to change a requirement value for each selected record. In response, the project management server 104 creates a record for each requirement change to reflect the new value. Additionally, section 1504 shows that a document or image may be attached or indexed to multiple requirements at the same time.

Progression Image Example Embodiment

Figure 16:
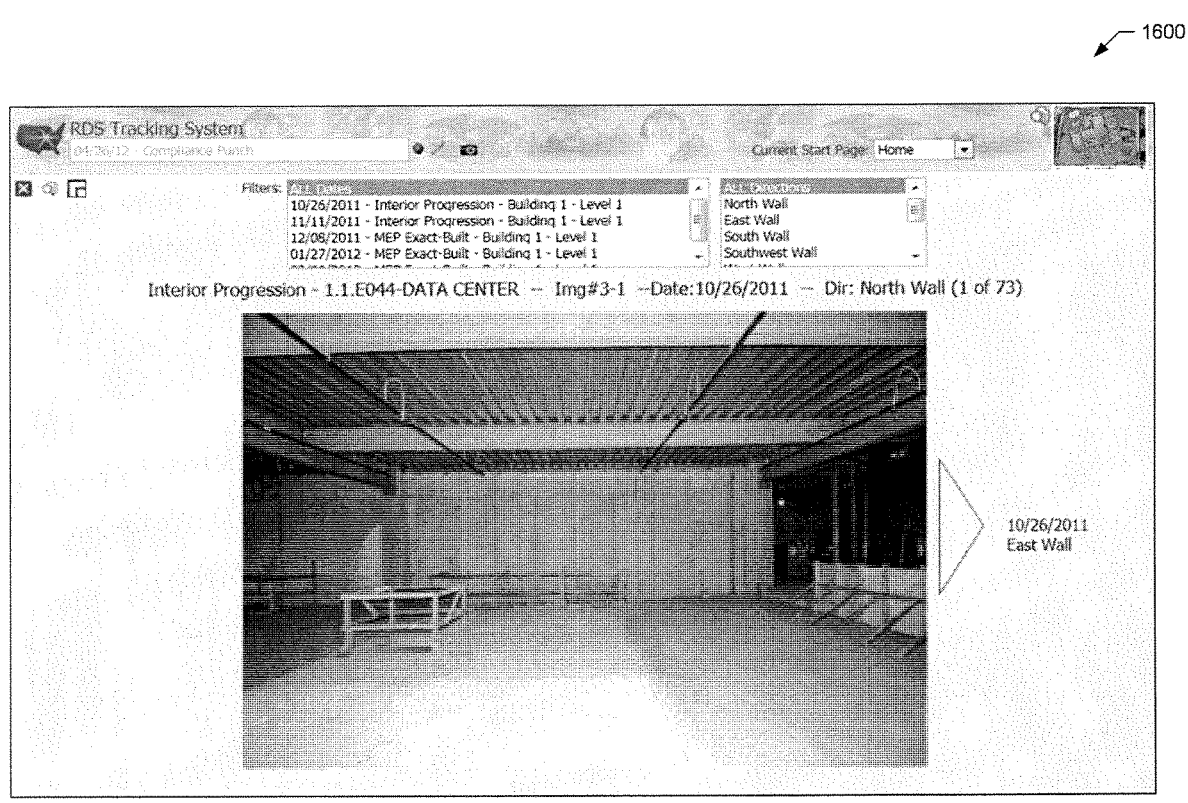

FIG. 16 is a diagram illustrating an example user interface 1600 displaying a progression image indexed or linked to one of the records of requirements shown in user interfaces 1300 or 1400 of respective FIGS. 13 and 14. The project management server 104 provides the progression image to client device 102 for display in the user interface 1600 in response to a user selecting a link to an image in a user interface (e.g., the image section 1306 in FIG. 13). Alternatively, a user may select a link to an image in a record or a requirement to view the user interface 1600.

The user interface 1600 includes filters, which enable a user to view progression images by a date an image was captured, a room or area, or a direction a camera was facing in a room or area. The user interface 1600 also includes navigation arrows that enable a user scroll to a next image. In this embodiment, the project management server 104 transmits the progression images for display in the user interface 1600 in response to receiving a selection of an image by a user. The user interface 1600 further includes magnification functionality, which enables a user to magnify portions of progression images.

Flowchart of the Example Process

FIGS. 17 to 20 are flow diagrams illustrating example procedures 1700, 1750, 1900, 1950, 2000, and 2050 to track, verify, and audit project requirements, according to an example embodiment of the present invention. The example procedures 1700, 1750, 1900, 1950, 2000, and 2050 may be carried out, by for example, the client devices 102, the project management server 104, and the project management database 108 described in conjunction with FIGS. 1 to 11. Although the procedures 1700, 1750, 1900, 1950, 2000, and 2050 are described with reference to the flow diagrams illustrated in FIGS. 17 to 20, it will be appreciated that many other methods of performing the acts associated with the procedures 1700, 1750, 1900, 1950, 2000, and 2050 may be used. For example, the order of many of the blocks may be changed, certain blocks may be combined with other blocks, and many of the blocks described are optional.

Figure 17:
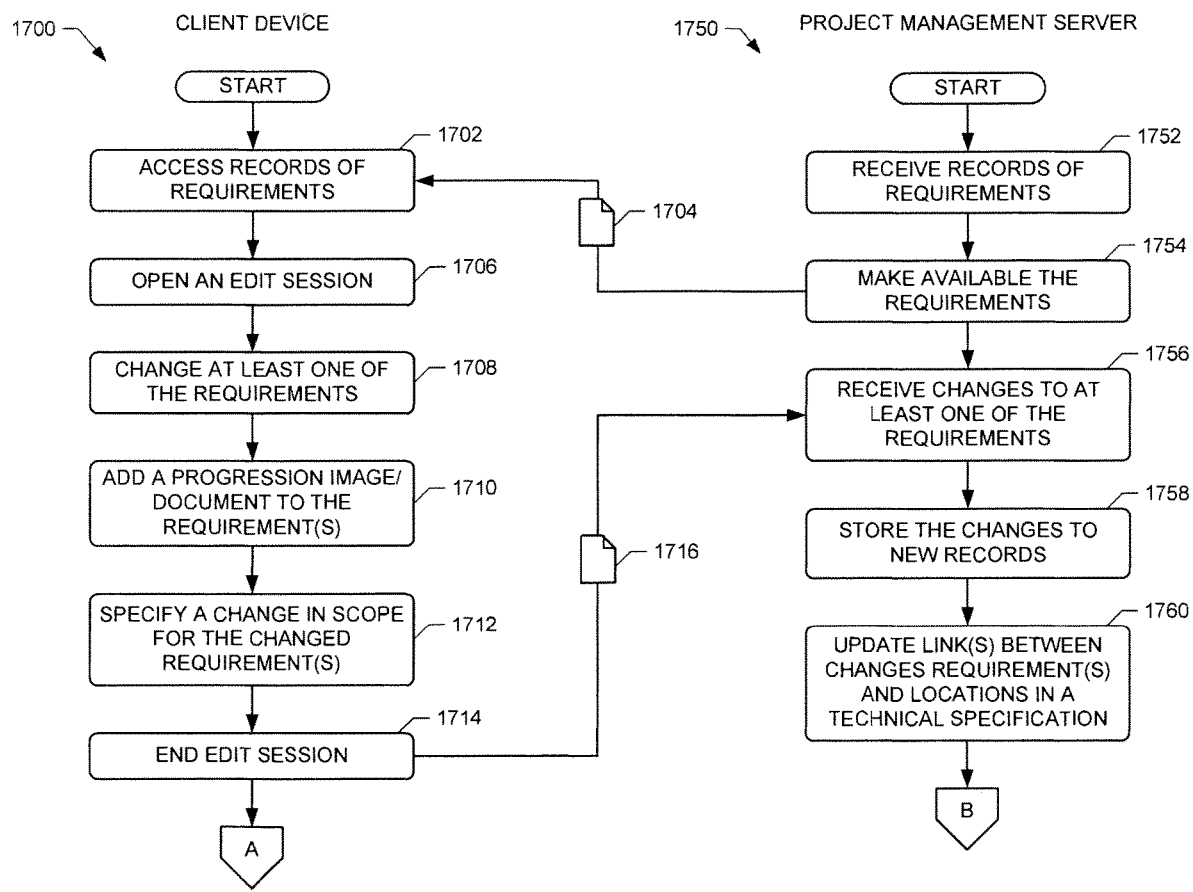
FIGS. 17 to 20 are flow diagrams showing example procedures to track, verify, and audit project requirements, according to an example embodiment of the present invention.
Figure 18:
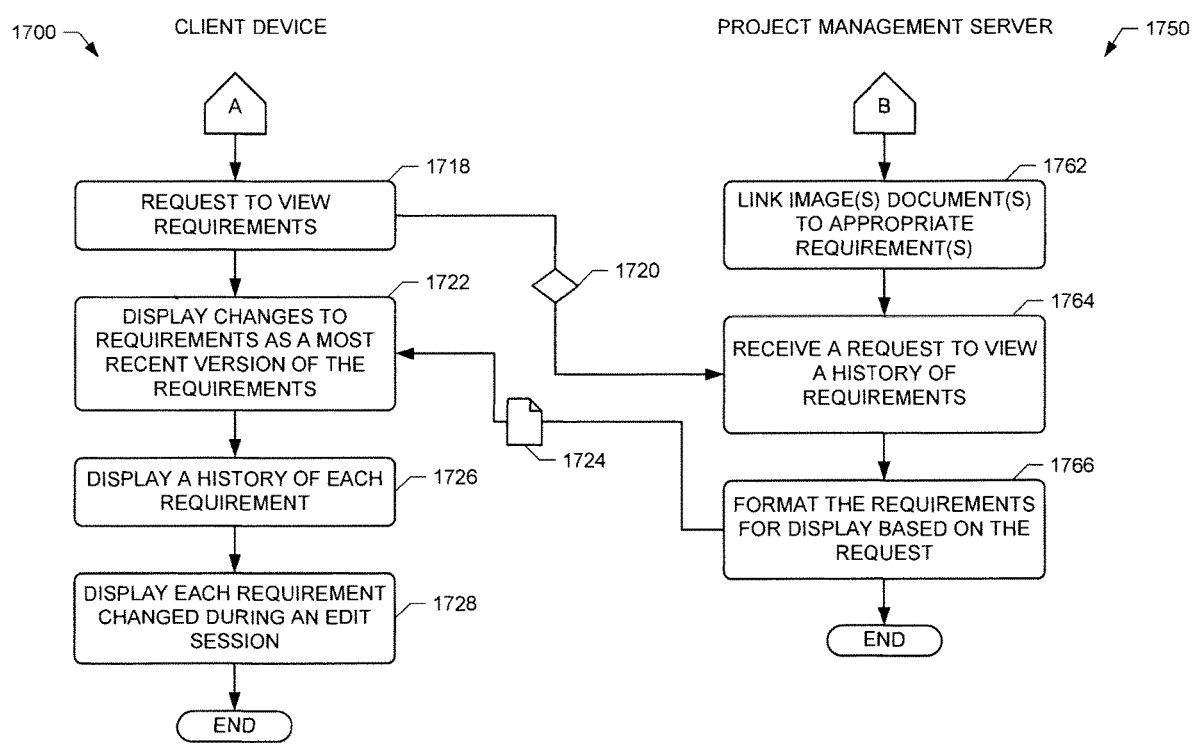

FIGS. 17 and 18 show example procedures 1700 and 1750 to change and view records of requirements. The procedure 1700 begins when a client device 102 requests to access records of requirements (block 1702). In response to this request, the project management server 104 transmits a compilation 1704 of copies of records to the client device 102. The client device 1700 next opens an edit session to edit at least some of the request requirements (block 1706).

A user of the client device 102 then changes one of the requirements (block 1708). In addition to changing a requirement, the user may also add a progression image or document to a requirement (block 1710). In some embodiments, a user may add a progression image or document separate from an edit session. Further, the user may specify a significance scope value or cost of a change to a requirement (block 1712). After a user has finished making requirement changes, the user ends the edit session (indicating the edit session is finalized), which causes the client device 102 to transmit a data structure 1716 of the changes to the project management server 104 (block 1714). In other examples, the client device 102 may transmit each change as the change is made or finalized by a user.

The example procedure 1700 continues in FIG. 18 by a user requesting via the client device 102 to view a most recent version of the requirements (block 1718). The client device 102 transmits a message 1720 with this request to the project management server 104. In response, the client device 102 receives a compilation 1724 from the project management server 104 including records of the requested requirements. The client device 102 displays the received records in a user interface, thereby providing the user with a most recent version of the requirements (block 1722).

For each displayed requirement, the user may view a history for each requirement (block 1726). The user may also view which requirements were changed during a specified edit session (block 1728). In some instances, the client device 102 may have to request records for a history of a requirement or records of edit session changes from the project management server 104. In other instances, the project management server 104 may include these records within the compilation 1724. After a user has finished viewing project requirements, the example procedure 1700 ends.

The example procedure 1750 of FIGS. 17 and 18 begin when the project management server 104 receives records of requirements (block 1752). These records may correspond to an initial set of requirements to begin a project. The project management server 104 makes available these records to client devices 102 (block 1754). The server 104 makes the records available by transmitting a compilation 1704 of records in response to a request by a device. This includes any finalized or verified changes to the requirements made before a request to view the requirements was received by the project management server 104.

The project management server 104 also receives changes to requirements via a data structure 1716 provided by a client device 102 (block 1756). In some instances, the project management server 104 may receive changes as they are made at the client device 102. In other instances, the project management server 104 may receive a single data structure from a client device 102. In these other instances, the single data structure may be sent after the client device 102 has reconnected to, for example, the network 106 or the server 104. For example, the data structure 1716 may be received after a client device synchronizes with the project management server 104.

After receiving changes from a client device 102, the project management server 104 stores the changes to newly created records (block 1758). The project management server 104 creates a record for each requirement change. In addition to creating a record, the project management server 104 may also update a link in a record to a different location in a technical specification document that corresponds to the changed requirement (block 1760).

The example procedure 1750 continues by the project management server 104 linking documents (or progression images) to a record (block 1762). The project management server 104 may link a record to a document based on instructions from a user during an edit session. Alternatively, the project management server 104 may link one or more records to a document (or progression image) without a user opening an edit session.

The project management server 104 also may receive messages 1720 from the client device 102 requesting to view a most recent version of requirements, a history of requirements, or requirements changed during an edit session (block 1764). In response, the project management server 104 searches the project management database 108 for records associated with the request and compiles copies of records of the requirements for transmission to the client device 102 (block 1766). This may include the project management server 104 rendering the records for display in a user interface of the client device 102. After a user has finished viewing records of requirements, the example procedure 1750 may end. Alternatively, the procedure 1750 may continue by returning to any of blocks 1752 to 1766 based on requests or requirement changes provided by client devices 102.

Figure 19:
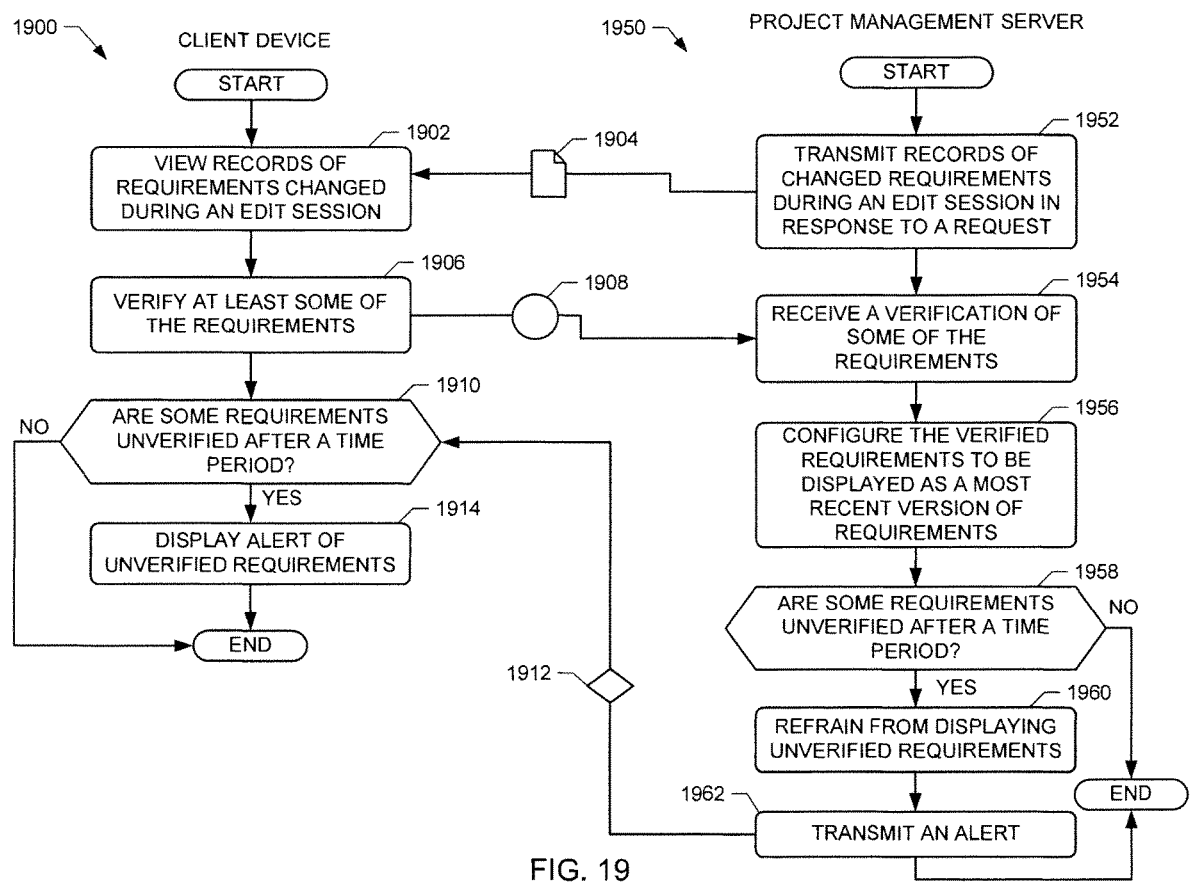

FIG. 19 shows example procedures 1900 and 1950 to verify or approve requirement changes. Procedure 1900 begins when client device 102 views records of requirements changed during an edit session (block 1902). Copies of records of the requested requirements are received as a compilation 1904 transmitted by the project management server 104. A user of the client device 102 may request to view requirements changed during a particular edit session with an intent to review and approve the changes. In some instances, the client device 102 may prompt a user to verify the requirements after a predetermined time period has elapsed since the requirements were changed.

After reviewing the changed requirements, a user of the client device 102 verifies some of the requirements (block 1906). The verification causes the client device 102 to transmit a message 1908 to the project management server 104 indicating which requirements were verified. The client device 102 may then determine (based on a message 1912 from the project management server 104) if some of the displayed unverified requirements have been unverified for a predetermined time period (block 1910). If there are no requirements that have been unverified for a specific time, then the procedure 1900 ends. However, if there is at least one requirement which has not been verified after a predetermined time period, the client device 102 displays an alert or message indicating the unverified requirement (block 1914). This alert or message is intended to cause a targeted user to review or verify changes to requirements in a timely manner. After a user has finished verifying or reviewing changes to requirements, the example procedure 1900 ends.

The example procedure 1950 begins when a project management server 104 transmits a compilation 1904 of copies of records in response to a request from a client device 102 (block 1952). The project management server 104 includes within the compilation 1904 all records corresponding to requirements that were changed, modified, or added during a specified edit session. In other examples, the project management server 104 may transmit each record separately to the client device 102.

The project management server 104 then receives a message 1908 indicating which records have been verified (block 1954). In response, the project management server 104 configures or sets the verified records to be available to other users as a most recent version of the respective requirement (block 1956). The project management server 104 next checks whether any requirements that were changed during the specified edit session have been unverified or approved for a time period (block 1958). If all requirements have been verified, the procedure 1950 ends. However, if there are requirements that have not been verified within a time period, the project management server 104 does not make the unverified records available to users viewing the corresponding requirements (block 1960). The project management server 104 may also transmit message 1912 including an alert, causing a client device 102 to prompt a user to review and verify the unverified records (block 1962). The procedure 1950 then ends.

Figure 20:
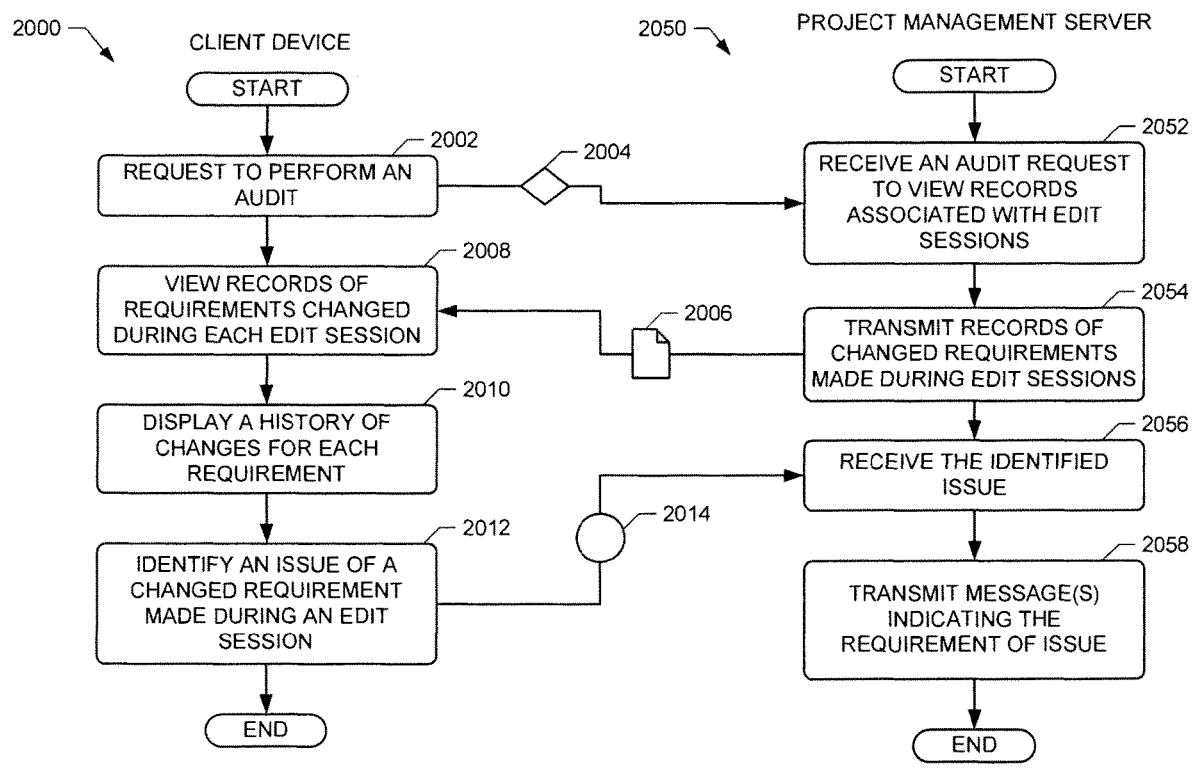

FIG. 20 shows example procedures 2000 and 2050 to audit project requirements. The procedures 2000 and 2050 may also describe steps to perform a project compliance check. Procedure 2000 beings when an auditor on client device 102 requests to perform an audit by sending a request message 2004 to a project management server 104 (block 2002). The message 2004 may include a project name and requirements to be audited.

The client device 102 receives a compilation 2006 of copies of records corresponding to the requested requirements to be audited (block 2008). The client device 102 then displays in a user interface the records (block 2010). The records may provide a history of changes made to each requirement, a most recent version of each requirement or changes made during edit sessions. The client device 102 then records any issues discovered by the auditor while reviewing the records (block 2012). The issues may correspond to requirements that were improperly changed during an edit session. The example client device 102 transmits a message 2014 that includes the identified issues to the project management server 104. The procedure 2000 ends when the auditor is finished viewing the records.

Procedure 2050 begins when the project management server 104 receives a message 2004 from a client device 102 requesting to view records associated with specific requirements or an edit session (block 2052). In response, the project management server 104 searches for the requested records and transmits copies of these records in a compilation 2006 to the client device 102 (block 2054). The project management server 104 then receives a message 2014 from the client device 102 identifying any issues discovered within the records (block 2056). The project management server 104 next transmits messages to appropriate users indicating issues with records or requirements (block 2058). The example procedure then ends.

For exemplary purposes, the present disclosure discusses various examples relating to project management requirement tracking. However, it should be appreciated that the disclosed system, methods, and apparatus may be advantageously used in a non-project management setting including, for example, information technology projects, software projects, process control projects, engineering projects, etc.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
a project management server configured to:
store requirements for a building construction or remodel project in a database, the stored requirements corresponding to a first version of a technical specification document and including:
at least a first requirement stored in a first record,
a first image associated with the first record, and
a first linkage between the first requirement and pixel locations of the first image,
wherein each requirement specifies a physical description or a value related to the construction or remodel of a building and the first record includes a requirement identifier and a date-stamp of when the first record was created;
receive, from a first client device, a change to the first requirement made during an edit session that corresponds to a second version of the technical specification document;
store, in the database, the changed first requirement to a second record, the second record including a requirement identifier and a date-stamp of when the second record was created;
store, in the database, a second image associated with the second record and a second linkage between the first requirement and pixel locations of the second image;
cause the first and second records to be displayed, by the first client device, in association with each other such that the changed first requirement is displayed as a most recent version of the first requirement;
receive a request to view a requirement history from the first client device or a second client device; and
provide, in a user interface, information from the first and second records to the first client device or the second client device so that the user interface displays the first requirement as specified in the first record in association with a date the first record was created and the first requirement as specified in the second record in association with a date the second record was created to show how the first requirement has changed during the building construction or remodel project,
wherein the project management server is configured to cause the information from the first and second records to be displayed in the user interface concurrently in relation to the date-stamps of the first and second records such that the information from the first and second records can be compared, and
wherein the project management server is configured to display the first and second images in the user interface as progression images of the first requirement.

2. The apparatus of claim 1, wherein the project management server is configured to:
indicate that the change to the first requirement as provided in the second record is unverified;
receive a verification message from at least one of the first client device or the second client device indicative that the first requirement as specified in the second record is verified; and
change a designation of the first requirement to indicate that the first requirement has been verified by an authorized user.

3. The apparatus of claim 2, wherein the project management server is configured to transmit an alert if the first requirement has not been verified within a predefined time period of when the second record was created.

4. The apparatus of claim 2, wherein the project management server is configured to provide a date at which the first requirement was verified and a name of an authorized user who verified the first requirement.

5. The apparatus of claim 1, wherein the date-stamp includes a time at which the respective first or second record was created.

6. The apparatus of claim 1, wherein the user interface includes information identifying a project area, information identifying a requirement, information indicating a requirement has been verified, and information describing the first requirement.

7. The apparatus of claim 1, wherein the project management server is configured to
display the first and second images concurrently in the user interface.

8. The apparatus of claim 7, wherein the project management server is configured to
display an indication of the first requirement in the first image within the user interface.

9. The apparatus of claim 1, wherein the project management server is configured to:

store a date the first image was created to the first record; and concurrently display the first requirement as specified in the first record, the first requirement as specified in the second record, and the first image as specified in the first record.

10. The apparatus of claim 1, wherein the first and second records are stored in a data structure that is related to the building construction or remodel project.

11. A machine-accessible device having instructions stored thereon that are configured when executed to cause a machine to at least:

receive requirements for a project, the requirements corresponding to a first version of a technical specification document and including:
at least a first requirement stored in a first record,
a first image associated with the first record, and
a first linkage between the first requirement and pixel locations of the first image;

receive a change to the first requirement during an edit session that corresponds to a second version of the technical specification document;

store the changed first requirement to a second record;

store a second image associated with the second record and a second linkage between the first requirement and pixel locations of the second image; and provide, in a user interface, information from the first and second records to a client device so that the user interface displays the first requirement as specified in the first record in association with a date the first record was created and the first requirement as specified in the second record in association with a date the second record was created to show how the first requirement has changed during the project, wherein the information from the first and second records is displayed in the user interface concurrently in relation to the dates of the first and second records such that the information from the first and second records can be compared, and wherein the first and second images are displayed in the user interface as progression images of the first requirement.

12. The machine-accessible device of claim 11, further comprising instructions stored thereon that are configured when executed to cause the machine to at least:

receive a cost of the change to the first requirement made during the edit session; and store the cost in association with the second record, the cost being displayable as a cost of the changes made during the edit session.

13. The machine-accessible device of claim 12, further comprising instructions stored thereon that are configured when executed to cause the machine to at least:

receive a first indication that the change to the first requirement made during the edit session includes a level of significant scope; and determine the cost of the change to the first requirement based on the level of significant scope.

14. The machine-accessible device of claim 12, further comprising instructions stored thereon that are configured when executed to cause the machine to at least store the changed first requirement to the second record only after the changes have been approved by an authorized user.

15. The machine-accessible device of claim 14, further comprising instructions stored thereon that are configured when executed to cause the machine to at least:

receive an audit request for the first requirement;

display the first requirement as specified in the first record and the first requirement as specified in the second record in response to the audit request; and display a date at which the first requirement was verified and the name of the authorized user.

16. The machine-accessible device of claim 11, further comprising instructions stored thereon that are configured when executed to cause the machine to at least:

receive from the client device a time period;

determine, as a point-in-time record, the second record has a date-stamp that is within the time period; and display, in the user interface, contents of at least the second record to show which requirements have changed during the specified time period.

17. The machine-accessible device of claim 11, wherein the instructions are distributed among data storage servers in a cloud computing network and the machine-accessible device is operated by a processing server in the cloud computing network, the processing server being remotely located from the data storage servers.

18. The machine-accessible device of claim 11, further comprising instructions stored thereon that are configured when executed to cause the machine to at least store the first record as a first file and store the second record as a second file.

19. The machine-accessible device of claim 11, further comprising instructions stored thereon that are configured when executed to cause the machine to store to the first record a requirement identifier of the first requirement and a date-stamp of when the first record was created, and store to the second record the requirement identifier of the first requirement and a date-stamp of when the second record was created.

* * * * *